United States Patent
Mazumder et al.

(10) Patent No.: US 7,372,709 B2
(45) Date of Patent: May 13, 2008

(54) POWER CONDITIONING SYSTEM FOR ENERGY SOURCES

(75) Inventors: Sudip K. Mazumder, Chicago, IL (US); Rajni K. Burra, Chicago, IL (US); Kaustuva Acharya, Chicago, IL (US)

(73) Assignee: The Board of Trustees of the University of Illinois, Chicago, IL (US)

( * ) Notice: Subject to any disclaimer, the term of this patent is extended or adjusted under 35 U.S.C. 154(b) by 0 days.

(21) Appl. No.: 11/230,312

(22) Filed: Sep. 19, 2005

(65) Prior Publication Data

US 2006/0062034 A1 Mar. 23, 2006

Related U.S. Application Data

(63) Continuation-in-part of application No. 10/938,469, filed on Sep. 10, 2004.

(60) Provisional application No. 60/501,955, filed on Sep. 11, 2003.

(51) Int. Cl.
*H02M 3/335* (2006.01)
(52) U.S. Cl. .................... 363/16; 363/17; 363/39; 363/132
(58) Field of Classification Search .......... 363/16, 363/17, 20, 21.01, 34, 37, 39, 131, 132, 2, 363/4, 8; 323/282
See application file for complete search history.

(56) References Cited

U.S. PATENT DOCUMENTS

| | | | | |
|---|---|---|---|---|
| 5,122,728 A | * | 6/1992 | Ashley | 323/282 |
| 5,204,809 A | * | 4/1993 | Andresen | 363/132 |
| 5,285,365 A | * | 2/1994 | Yamato et al. | 363/8 |
| 5,598,326 A | * | 1/1997 | Liu et al. | 363/34 |
| 5,856,712 A | * | 1/1999 | Suzuki et al. | 363/34 |
| 6,005,788 A | * | 12/1999 | Lipo et al. | 363/71 |
| 6,437,999 B1 | * | 8/2002 | Wittenbreder | 363/39 |
| 2004/0125618 A1 | * | 7/2004 | De Rooij et al. | 363/17 |

OTHER PUBLICATIONS

9. Sample Calculations http://www.materialsworld.net/PASI/reading/Pages_369_to_451_from_FCHandbook6.pdf, no date.

Andersen, G.K., Klumpner, C., Kjaer, S.B., and Blaabjerg, F., 2002, A new green power inverter for fuel cells, *IEEE Power Electronics Specialists Conference*, pp. 727-733, no month.

Gopinath, R., Kim, S.S., and Enjeti, P. et al., 2002, Development of a low cost fuel cell inverter with DSP control, *IEEE Power Electronics Specialists Conference*, pp., no month.

Pradeep, G.W., Mohammad, H., and Famouri, P., et al., 2003, High efficiency low cost inverter system for fuel cell application, *Fuel Cell Seminar*, no month.

Mazumdar, J., Batarseh, I., and Kutkut, N. et al., 2002, High frequency low cost DC-AC inverter design with fuel cell source for home applications, *IEEE Industry Applications Conference*, pp. 789-794, no month.

Tuckey, A.M. and Krase, J.N., 2002, A low-cost inverter for domestic fuel cell applications, *IEEE Power Electronics Specialists Conference*, pp. 339-346, no month.

(Continued)

*Primary Examiner*—Jessica Han
(74) *Attorney, Agent, or Firm*—Greer, Burns & Crain, Ltd.

(57) ABSTRACT

Apparatus for conditioning power generated by an energy source includes an inverter for converting a DC input voltage from the energy source to a square wave AC output voltage, and a converter for converting the AC output voltage from the inverter to a sine wave AC output voltage.

17 Claims, 21 Drawing Sheets

OTHER PUBLICATIONS

Krein, P.T. and Balog, R., 2002, Low cost inverter suitable for medium-power fuel cell sources, *IEEE Power Electronics Specialists Conference*, pp. 321-326, no month.

Ertl, H., Kolar, J.W., and Zach, F.C., 2002, A novel multicell dc-ac converter for applications in renewable energy systems, *IEEE Transactions on Industrial Electronics*, pp. 1048-1057, no month.

Wang, J. and Peng, F.Z., 2003, A new low cost inverter system for 5 kW fuel cell, *Fuel Cell Seminar*. (available at http://www.energychallenge.org/FuelCellSeminar.pdf), no month.

Bohn, T.P. and Lorenz, R.D., 2003, A low-cost inverter for domestic fuel cell applications, *Fuel Cell Seminar*. (available at http://www.energychallenge.org/FuelCellSeminar.pdf), no month.

Kawabata, T., Komji, H., and Sashida, K. et al., 1990, High frequency link DC/AC converter with PWM cycloconverter, *IEEE Industrial Application Society Conference*, pp. 1119-1124, no month.

Deng, S. and Mao, H., 2003, A new control scheme for high-frequency link inverter design, *IEEE Applied Power Electronics Conference and Exposition*, pp. 512-517, no month.

Haynes, C. and Wepfer, W.J., Characterizing heat transfer within a commercial-grade tubular solid oxide fuel cell for enhanced thermal management, *International Journal of Hydrogen Energy*, no date.

Acharya, K., Mazumder, S.K., and Burra, R.K. et al., 2003, System-interaction analyses of solid-oxide fuel cell (SOFC) power-conditioning system, *IEEE Industrial Application Society Conference.*, pp. 2026-2032, no month.

Randall S. Gemmen, Ph.d Analysis For The Effect of Inverter Ripple Current on Fuel Cell Operating Condition, NETL/DOE, Morgantown WV www.nfcrc.uci.edu/UFFC/PowerElectronics/PDFs/24_&20Gemmen.pdf, no date.

Pyke, S.H., Burnett, A.J., and Leah, R.T. et al., Systems development for planar SOFC based power plant, *ETSU F/01/00195/REP, DTI/Pub UNR 02/868, Contractor: ALSTOM Research and Technology Centre*, no date.

R.K. Burra, S.K. Mazumder, and R. Huang, A low-cost fuell-cell (FC) power electronic system (PES) for residential loads, *IEEE International Telecommunications energy conference*, 2004, pp. 468-478, no month.

S.K. Mazumder and R. Burra, "Fuel Cell Power Conditioner for Stationary Power System: Towards Optimal Design from Reliability, Efficiency, and Cost Standpoint" Keynote Lecture on Fuel cell power electronics system, *ASME Third International Conference on Fuel Cell Science, Engineering and Technology*, Yipsilanti, Michigan, FUELCELL2005-74178, May 23-25, 2005.

Novaes, Y.R. and Barbi, I., 2003, Low Frequency Ripple Current Elimination in Fuel Cell Systems, *Fuel Cell Seminar*, (available at http://www.energychallenge.org/FuelCellSeminar.pdf), no month.

Dr. Jason Lai, A High-Efficiency Low-Cost DC-DC Converter for SOFC http://www.netl.doe.gov/publications/proceedings/03/seca%20core/Jason%20Lai%20VT.pdf, no date.

Robert Balog, "Low Cost 10kW Inverter System for Fuel Cell interface" http://power.ece.uiuc.edu/Balog/images/Future%20Energy%20Challenge%202001/FEC2001_files/frame.htm, no date.

Saito, M. and Matsui, N., 2003, Modeling and control strategy for a single-phase PWM rectifier using a single-phase instantaneous active/reactive power theory, *IEEE International Telecommunications Energy Conference*, pp. 573-578, no month.

Enjeti, P.N. and Kim, S., 1991, A new dc-side active filter for inverter power supplies compensates for unbalanced and nonlinear loads, *IEEE Industry Applications Society Conference*, pp. 1023-1031, no month.

Peng, F.Z., 1998, Application issues of active power filters, *IEEE Industry Applications Magazine*, pp. 21-30, no month.

Shimzu, T., Fujita, T., and Kimura G. et al., 1997, A unity power factor PWM rectifier with DC ripple compensation, *IEEE Transactions on Industrial Electronics*, pp. 447-455, no month.

\* cited by examiner

MODE 2

US 7,372,709 B2

POWER CONDITIONING SYSTEM FOR ENERGY SOURCES

RELATED APPLICATION REFERENCE AND PRIORITY CLAIM

This application is a CIP of U.S. patent application No. 10/938,469 filed Sep. 10, 2004, which claims priority of U.S. Provisional Application No. 60/501,955, filed Sep. 11, 2003, under 35 U.S.C. § 119.

STATEMENT OF GOVERNMENT INTEREST

The invention was made with Government assistance under Department of Energy, Grant No. DE-FC2602NT41574. The Government has certain rights in this invention.

FIELD OF THE INVENTION

A field of the invention is in power conditioning systems, and in particular, but not limited to, a power conditioning system for alternative-energy sources such as fuel cell and photovoltaic.

BACKGROUND OF THE INVENTION

Hydrogen fuel cell (FC) energy and photovoltaic energy are examples of the front-runners among alternate-energy solutions to address and alleviate the imminent and critical problems of existing fossil-fuel-energy systems: environmental pollution due to high emission level and rapid depletion of fossil fuel. Power conditioning systems (PCS) are required to condition the energy generated by the alternative-energy sources to, forms which can be used readily by the consumers. The choice of PCS topologies for FC energy systems, for example, can be broadly categorized as push-pull and full-bridge based topologies. Push-pull based topology, owing to its low part count, is a good candidate for a low-cost FC converter. However, at higher power it suffers from problems due to transformer flux imbalance and core-saturation.

Because of the symmetrical transformer flux and equal electrical stress distribution, several variations of full-bridge inverter topologies have been found to be useful from the cost and efficiency point of view. However, for high-voltage applications, the voltage stress on the switches increases significantly, thereby degrading the reliability of the overall PCS.

An important variable in the design of the PCS for alternative-energy sources such as fuel-cells is the amount of ripple current the fuel cell can withstand. It is known that a large ripple current will reduce the maximum power output available from the FC stack, but apart from this little is known about the dynamic electrical performance, particularly with regard to long-term effects. Also, since the reactant utilization is known to impact the mechanical nature of a fuel-cell, it is suggested that the varying reactant conditions surrounding the cell (due to ripple current) govern, at least in part, the lifetime of the cells. Both the magnitude and frequency of the ripple current is important. Fuel-cell power electronics for residential and commercial applications are typically designed to have a single or a two-phase output. Single and two-phase inverter systems draw a sinusoidal current component at twice the fundamental frequency. For fuel-cells powering single phase loads (60 Hz), the ripple current of concern is twice the output frequency, i.e., 120 Hz. A limit of 0.15 per-unit (i.e. 15% of its rated current) from 10% to 100% load is specified. Apart from the direct effect on the fuel cell durability, the harmonics have the effect of increasing the power-conditioner copper, iron and dielectric losses and thus increasing the thermal stress on the power stage components. Power derating of the individual components and over sizing is a preventive measure which results in compromise in power density and increased costs.

SUMMARY OF THE INVENTION

The present invention is directed to an apparatus for conditioning power generated by an energy source. The apparatus includes an inverter for converting a DC input voltage from the energy source to a square wave AC output voltage, and a converter for converting the AC output voltage from the inverter to a sine wave AC output voltage.

BRIEF DESCRIPTION OF THE DRAWINGS

FIG. 4 is a circuit diagram of the boost converter of the power conditioning system of FIG. 2 when switch SB1 is on;

DETAILED DESCRIPTION OF THE PREFERRED EMBODIMENTS

Figure 1:
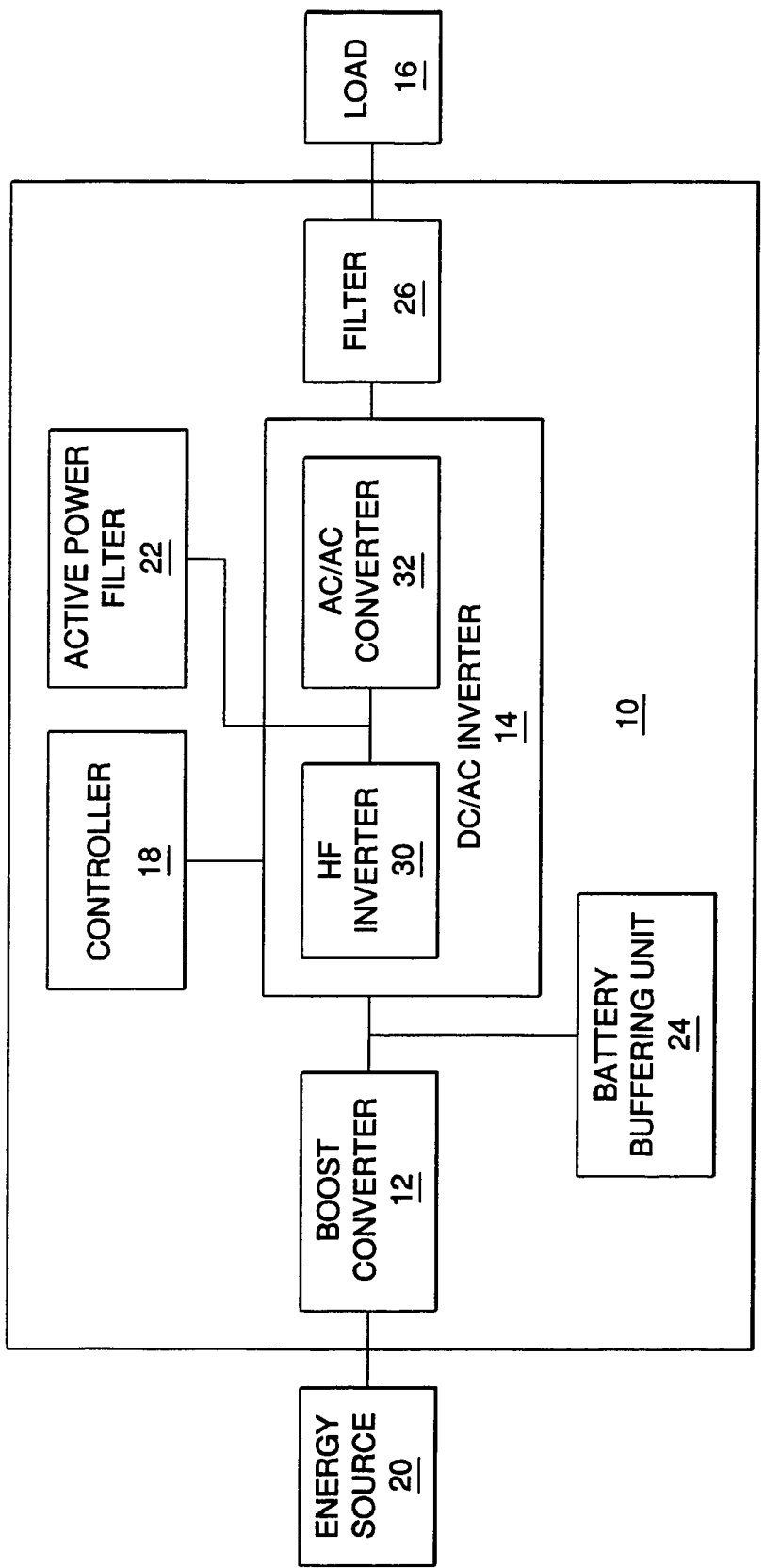
FIG. 1 is a block diagram of a power conditioning system (PCS) in accordance with one embodiment of the present invention.

Turning now to FIG. 1, a power conditioning systems (PCS) 10 in accordance with one embodiment of the present invention includes a boost converter 12 for stepping up the input DC voltage to a HVDC, followed by a DC/AC inverter 14, the output of which is connected to a load 16 which may be a stand-alone load or a utility grid, for example. A controller 18 controls the operation of the DC/AC inverter 14. The boost converter 12 generates a high voltage DC (e.g., >350V) at its output and the DC/AC inverter 14 generates a single, two or three phase AC voltage at its output. The input DC voltage is supplied by an alternative-energy source 20 such as, for example, a fuel cell (FC) source. The PCS 10 of the present invention also includes an active power filter 22 for minimizing the low frequency ripple current harmonics in the output current of the energy source 20, a battery buffering unit 24 for providing the excess energy during a load transient, and a low pass filter 26 connected between the DC/AC inverter 14 and the load 16 for reducing the magnitude of higher order frequency components from the output voltage at the load 16.

The battery buffering unit 24, which is connected to the input to the DC/AC inverter 14, is a bi-directional DC/DC converter, for example, and provides power to the load 16 during a period when the load fluctuates up and down and the energy source 20 is unable to respond to the transient load continuously. When the energy source 20 comes up or down to the load level the battery buffering unit 24 is disconnected from the load 16. Known battery buffering units for use in power conditioning systems can be employed as the battery buffering unit 24 of the present invention.

Figure 2:
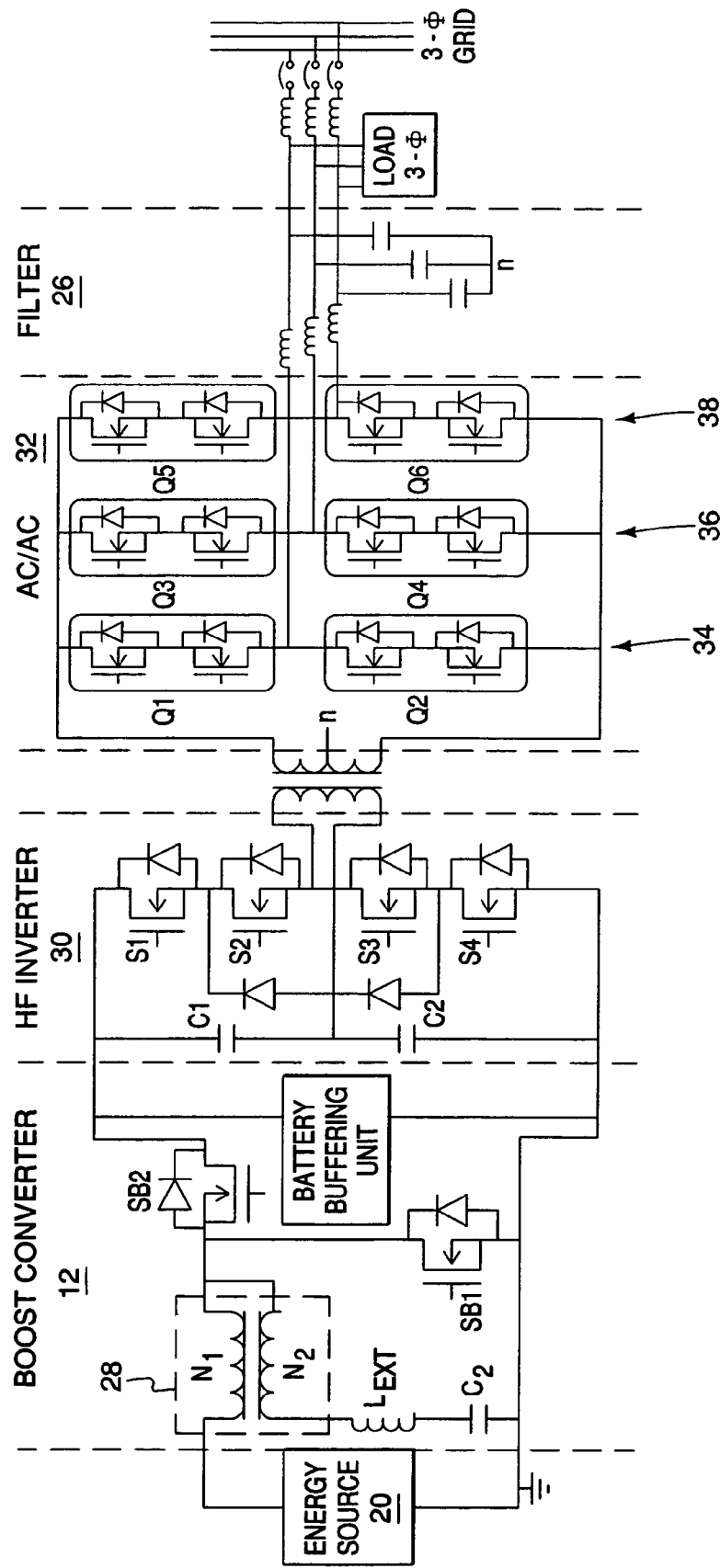
FIG. 2 is a circuit diagram of the PCS of FIG. 1.

Referring now to FIG. 2, the boost converter 12, in one embodiment, is a non-isolated boost converter with a coupled inductor 28. The secondary winding $N_2$ of the coupled inductor 28 is connected to an external trimming inductor $L_{ext}$ and a filter capacitor $C_f$. In the coupled inductor 28, the input current from the energy source 20 is split between the windings $N_1$, $N_2$. The primary winding $N_1$ conducts the DC current and the secondary winding $N_2$ conducts the AC current, thereby making the output current of the energy source 20 substantially ripple free.

Figure 3:
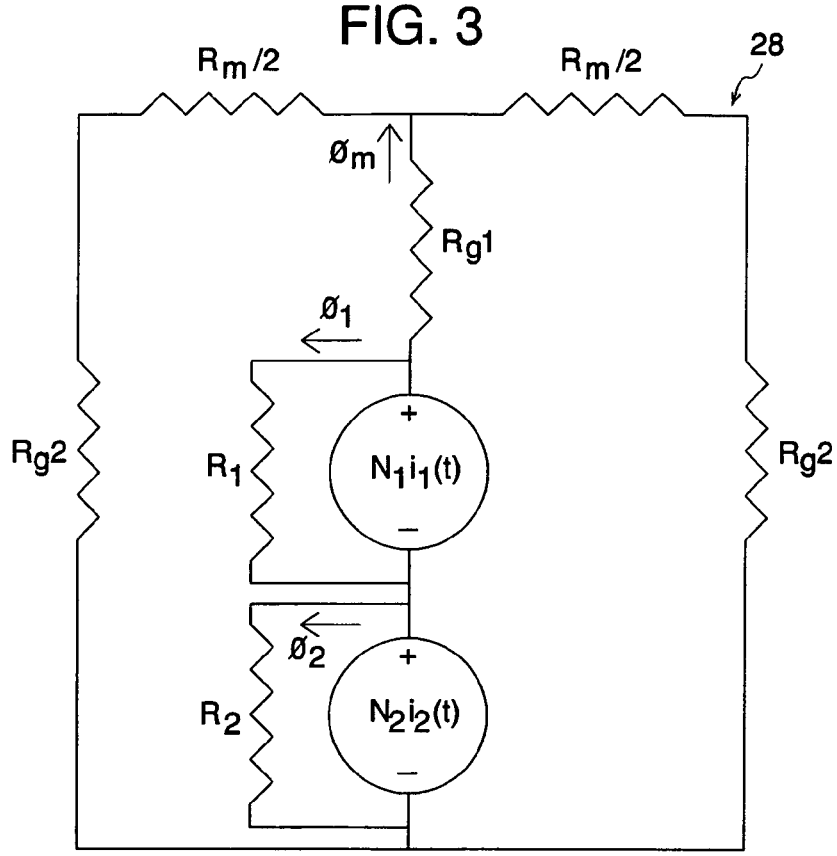
FIG. 3 is an equivalent reluctance model of a zero-ripple inductor of the boost converter of the power conditioning system of FIG. 2.

FIG. 3 shows the generalized reluctance model for the coupled inductor 28. The currents $i_1$ and $i_2$ are primary and secondary AC currents, respectively, fluxes $\phi_1$ and $\phi_2$ are primary and secondary leakage fluxes and the $\phi_m$ is the flux associated with the magnetic core of the coupled inductor 28. Using the reluctance model, the expression for the input AC current from the energy source 20 is derived to be:

$$i_1 = \frac{\phi_o}{N_1^2 \left( \frac{1}{R'_m R_1} + \frac{1}{R'_m R_2} + \frac{1}{R_1 R_2} \right)} \left[ n \left( \frac{1}{R'_m} + \frac{1}{R_2} \right) - \frac{1}{R'_m} \right] \quad (1)$$

where
$N_1$ is the primary turns
$N_2$ is the secondary turns
$n = N_2/N_1$ is the turns ratio
$R_m'$ is the reluctance of the core including the air gap
$R_1$ is the primary leakage reluctance
$R_2$ is the secondary leakage reluctance From equation (1) the condition for the zero AC input current can be expressed as:

$$n = k = \frac{R_2}{R_2 + R'_m} \quad (2)$$

where n<1 (for zero input ripple current) and $$R'_m = R_{g1} + \frac{R_{g2}}{2} + \frac{R_m}{4}$$

($R_{g1}$ and $R_{g2}$ are the air gap reluctances).

Effective reluctance expressions for various different types of coupled inductor cores that may be used as the coupled inductor 28 are shown below in Table I.

TABLE I

| Core type | Expression |
| --- | --- |
| E-E (3 limbs and symmetrical outer limbs) | $R'_m = R_{g1} + \frac{R_{g2}}{2} + \frac{R_m}{4}$ |
| E-I (3 limbs and symmetrical outer limbs) | $R'_m = R_{g1} + \frac{R_{g2}}{2} + \frac{R_m}{4}$ |
| U-U | $R'_m = R_{g1} + R_{g2} + R_m$ |
| U-I | $R'_m = R_{g1} + R_{g2} + R_m$ |
| Gapped Toroid | $R'_m = R_{g1} + R_m$ |

From the above expressions it can be seen that the zero-ripple input current condition depends on the choice and shape of the core, the turns ratio and the coupling coefficient. Theoretically, the input zero-ripple current condition is valid for all values of n, k<1. However, because of production tolerances and temperature variations, it may not be possible to adjust the secondary leakage reluctance to a very high degree of accuracy by only adjusting the air-gap. Therefore, an external trimming inductance from the external inductor $L_{ext}$ is used to achieve the zero-ripple condition.

Figure 4:
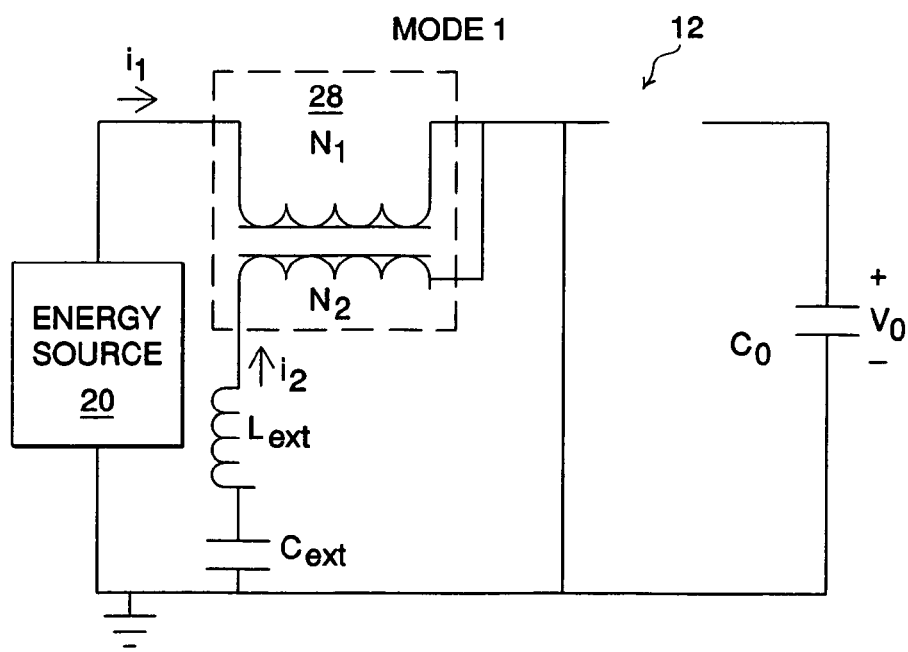
Figure 5:
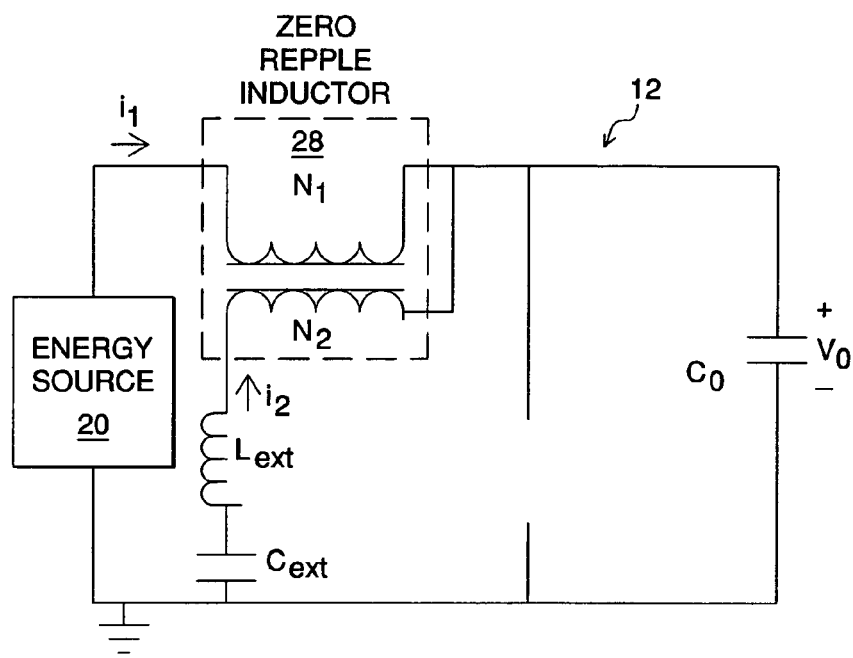
FIG. 5 is a circuit diagram of the boost converter of the power conditioning system of FIG. 2 when switch SB1 is off.

Referring to FIGS. 4 and 5, the boost converter 12 has two modes of operation. In mode 1, (shown in FIG. 4), the switch/diode SB1 (shown in FIG. 2) is turned on. During this mode the inductor $L_{ext}$ is charged through the input voltage, while the capacitor $C_o$ discharges through the load. During mode 2, the switch/diode SB2 (shown in FIG. 2) is turned on, as shown in FIG. 5 and the inductor charges the capacitor $C_o$. This charging and discharging action results in an output DC voltage that is higher than the input DC voltage from the energy source 20. In both modes 1 and 2, the DC current is supplied by the energy source 20, while the AC current comes from the secondary winding $N_2$ of the coupled inductor 28.

Turning back to FIG. 2, the DC/AC inverter 14 includes a high frequency multilevel (HF) inverter 30 followed by a cycloconverter or AC/AC converter 32. To achieve a sine wave AC at the output (60 Hz, for example) a sine wave modulation may be performed either on the HF inverter 30 or the AC/AC converter 32. In one embodiment of sine wave modulation, the switches in the HF inverter 30 are switched at fixed 50% duty pulse, while the switches in the AC/AC converter 32 are sine wave modulated. In another embodiment of sine wave modulation, the switches in the HF inverter 30 are rectified sine wave modulated, while the switches of the AC/AC converter 32 are switched based on the power flow information. In the first embodiment of sine wave modulation, zero-current switching of the HF inverter 30 results in low turn-off loss, and in the second embodiment, zero-voltage switching of the HF inverter 30 results in low turn-on loss. Both embodiments of sine wave modulation result in the soft switching of the HF inverter 30 while the AC/AC converter 32 is hard switched. As known in the art, during the turn-on and turn-off of switches, if the product of switch current and switch voltage is zero, then the switch is said to undergo a "soft switching" or else it is "hard switching." If the current approaches zero before the voltage, the soft switching mechanism is called zero-current switching (ZCS). If the voltage goes to zero before the current, the soft switching mechanism is called zero-voltage switching (ZVS)].

As now described in more detail, in the modulation of the AC/AC converter 32, the HF switches S1-S4 of the HF inverter 30, which are turned on and off with a 50% duty pulse to generate a HF square wave AC at its output, are arranged in a multi-level fashion. The multi-level arrangement results in a reduced voltage stress across the switches, thereby improving the reliability and facilitating the use of low cost switches. Multi-level arrangement of switches S1-S4 is particularly useful when the intermediate DC voltage, i.e., the output DC voltage from the boost converter 12 is greater than 500 V, for example.

The output of the HF inverter 30 feeds the input of the AC/AC converter 32. The AC/AC converter 32 has 2 (Q1 and Q2), 4 (Q1-Q4) or 6 (Q1-Q6) bidirectional switches for single, two or three phase outputs, respectively, with two switches on each of the legs 34, 36, 38, i.e., switches Q1 and Q2 on the leg 34, switches Q3 and Q4 on leg 36 and switches Q5 and Q6 on leg 38. The switches Q1-Q6 on each of the legs 34, 36, 38 are switched complimentary to each other, such that two switches on the same leg are not turned on at the same time.

Figure 6:
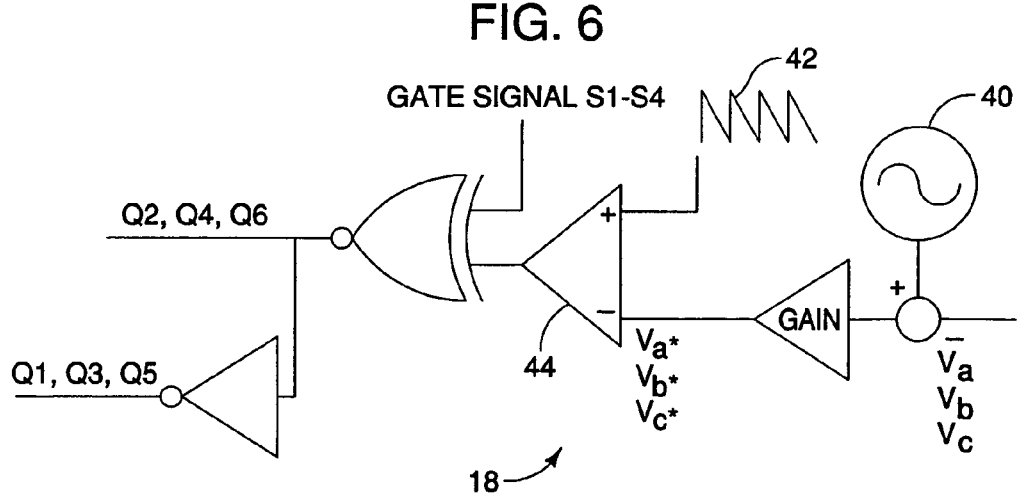
FIG. 6 is a block diagram of a controller for modulating the AC/AC converter of the power conditioning system of FIG. 2.

As shown in FIG. 6, the controller 18 (shown in FIG. 1) is a sine wave modulated PWM controller, and is implemented to provide the gating pulses for the switches Q1-Q6 of the AC/AC converter 32. The voltages $V_a$, $V_b$ and $V_c$ output to the load 16 are compared with sinusoidal reference voltages from a reference generator 40 such as, for example, a phase shift oscillator, a digitally implemented sine wave generator or a look up table in a digital signal processor (DSP) and the resulting control signals $V_a^*$, $V_b^*$ and $V_c^*$ are compared with a ramp signal from a ramp generator 42 in the PWM comparator 44. The obtained PWM signal is EX-NORed with the gate signal of switches S1-S4 of the HF inverter 30 to generate the corresponding gate signals for the switches Q1-Q6. The gate signals S1-S4 may be generated from any digital or analog 50% square wave generator (not shown).

For two and three phase systems, the switches S1-S4 of HF inverter 30 are turned off under zero-current switching (ZCS). When the AC/AC converter 32 outputs a non-zero voltage, power is transferred from the input at the energy source 20 to the output at the load 16. However, when the output voltage of the AC/AC converter 32 is zero, the load current freewheels. During freewheeling there is no transfer of energy from the input to the output, i.e. the switches are operated such that there is no connection between input and output and the current flows through the switches of the AC/AC converter 32 and no power is transferred to the load 16.

Zero current in the secondary windings of a transformer 46 connecting the HF inverter 30 and the AC/AC converter 32, results in a zero current in the transformer primary windings, and hence, the switches S1-S4 of the HF inverter 30 are turned off under ZCS. For a single-phase output, the freewheeling interval is not present and hence the switches S1-S4 of the HF inverter 30 do not undergo ZCS.

Figure 7:
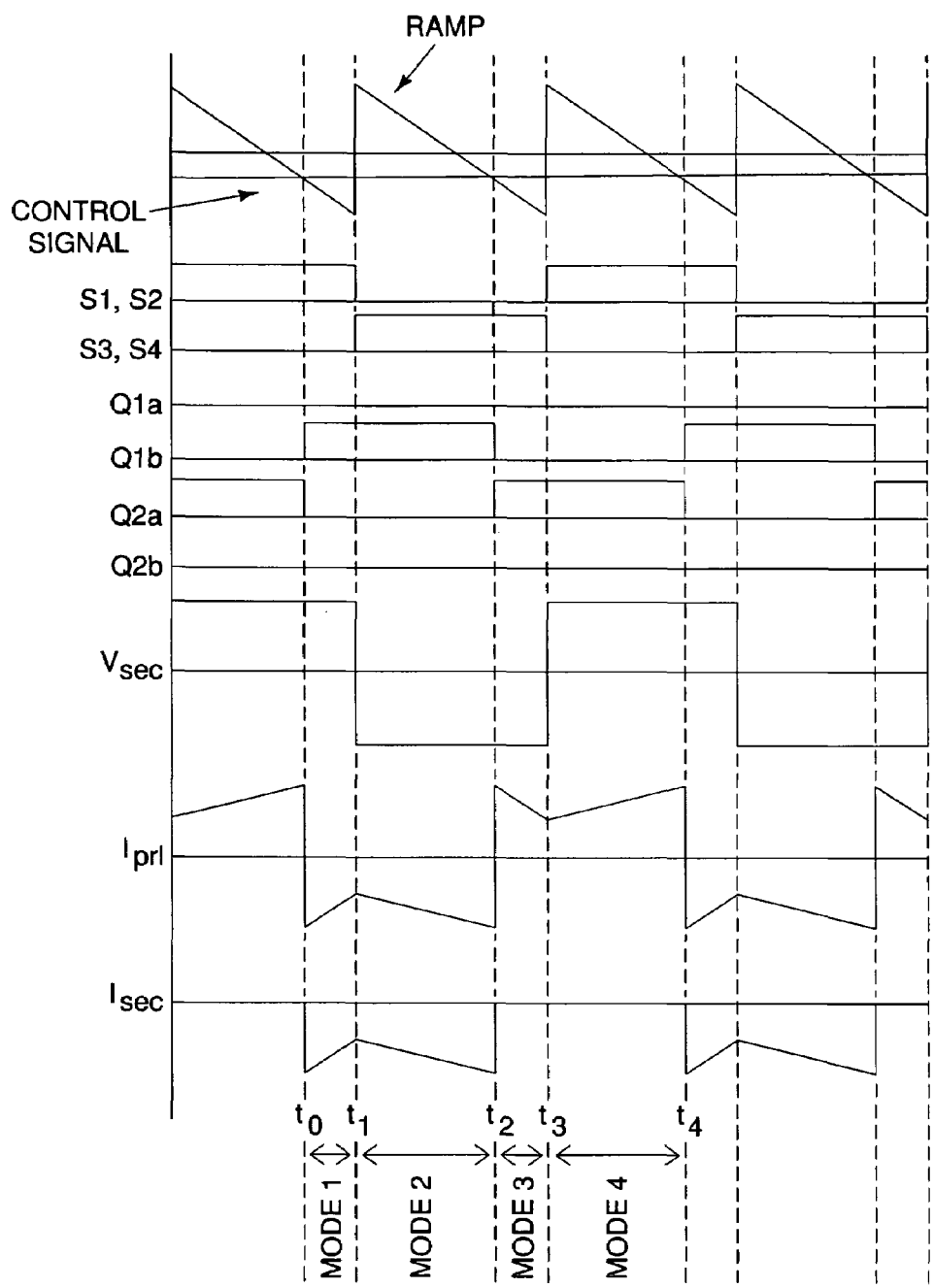
FIGS. 7 and 8 show the switching pulses of the high-frequency inverter and the AC/AC converter, the voltage across the secondary of the high-frequency transformer and the current in the primary and secondary windings of the high-frequency transformer of the of the power conditioning system of FIG. 2.
Figure 8:
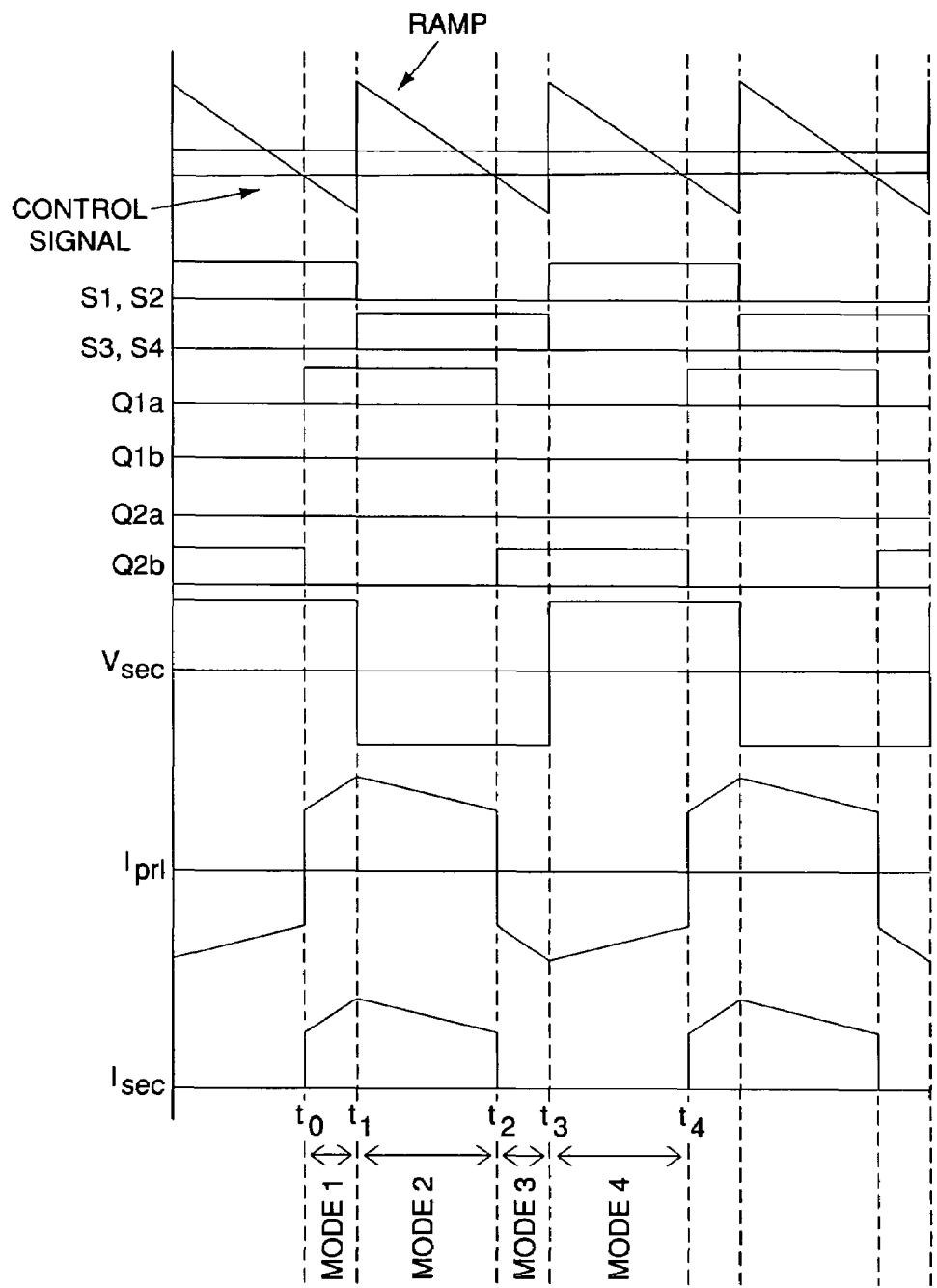
Figure 9:
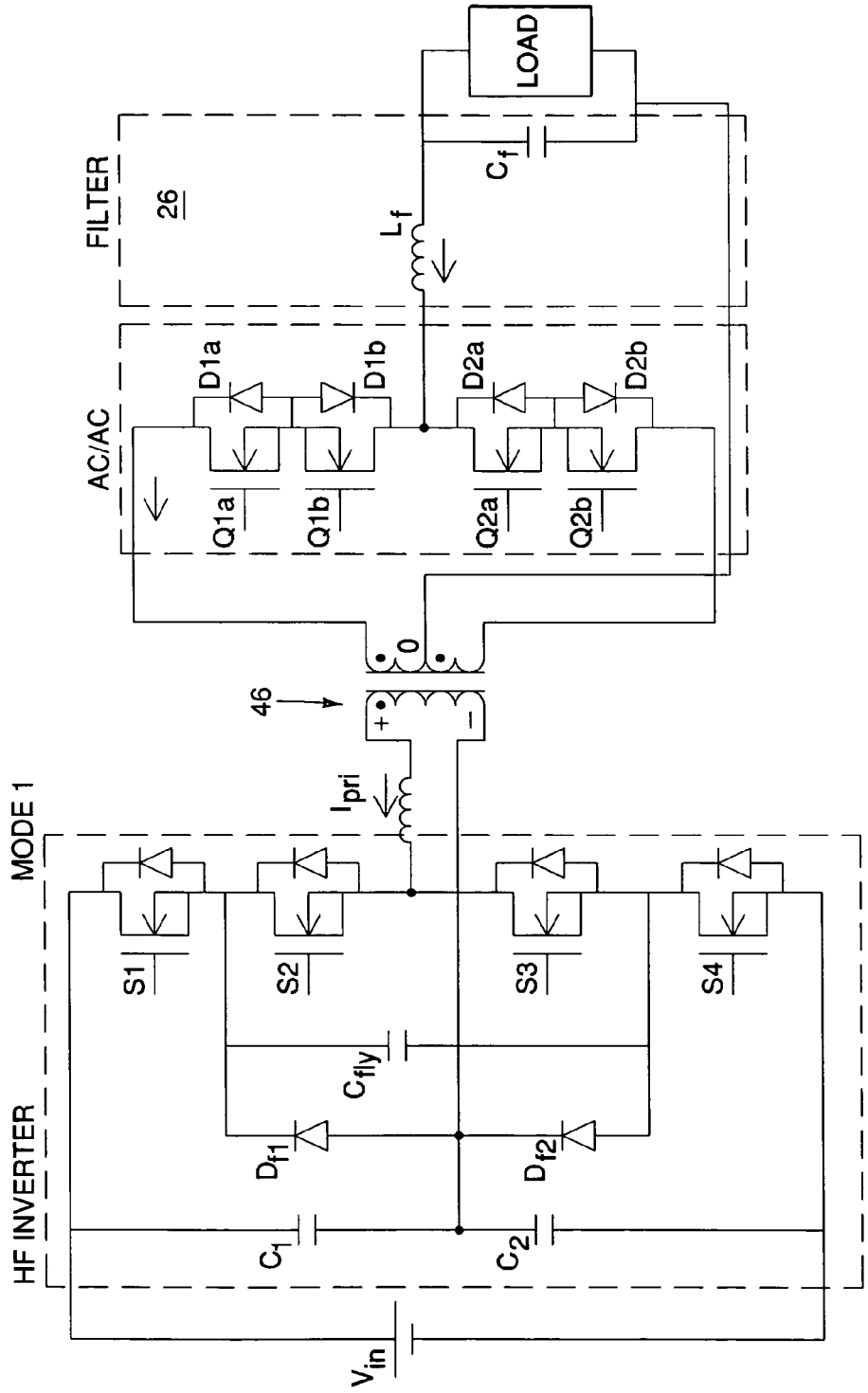
FIGS. 9-12 show the current flow in the high-frequency inverter and the AC/AC converter of the of the power conditioning system of FIG. 2 during four operating modes.
Figure 10:
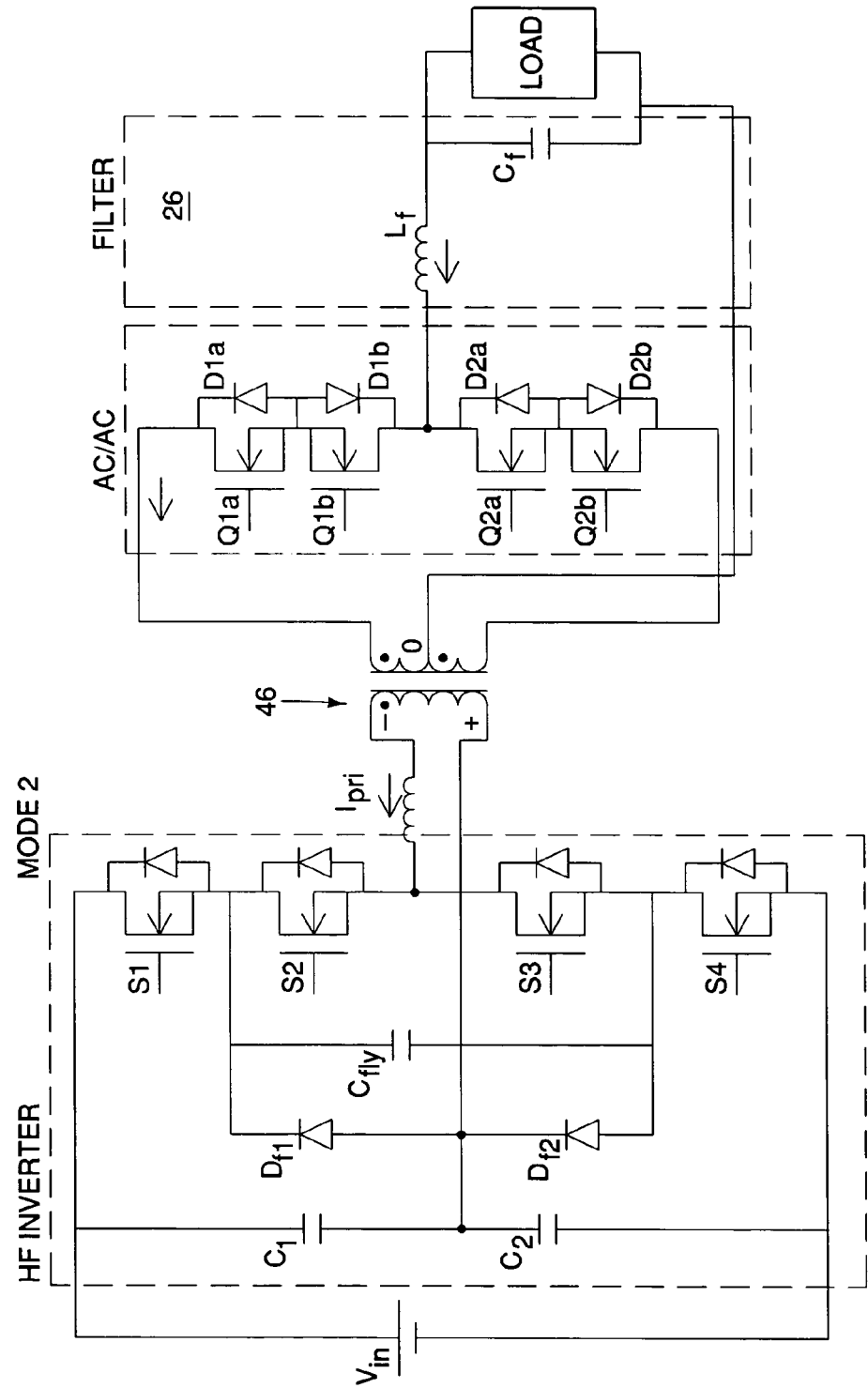
Figure 11:
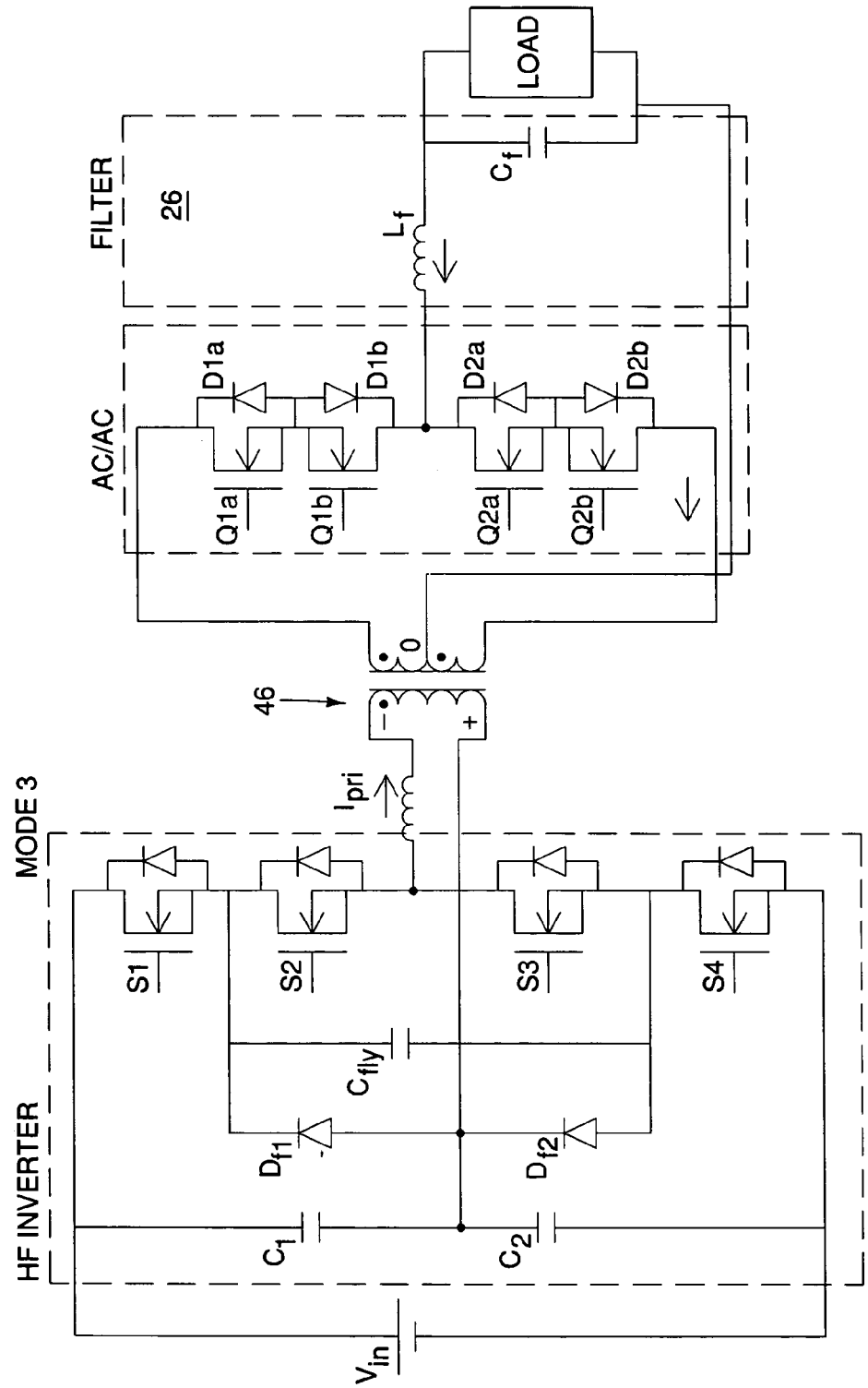
Figure 12:
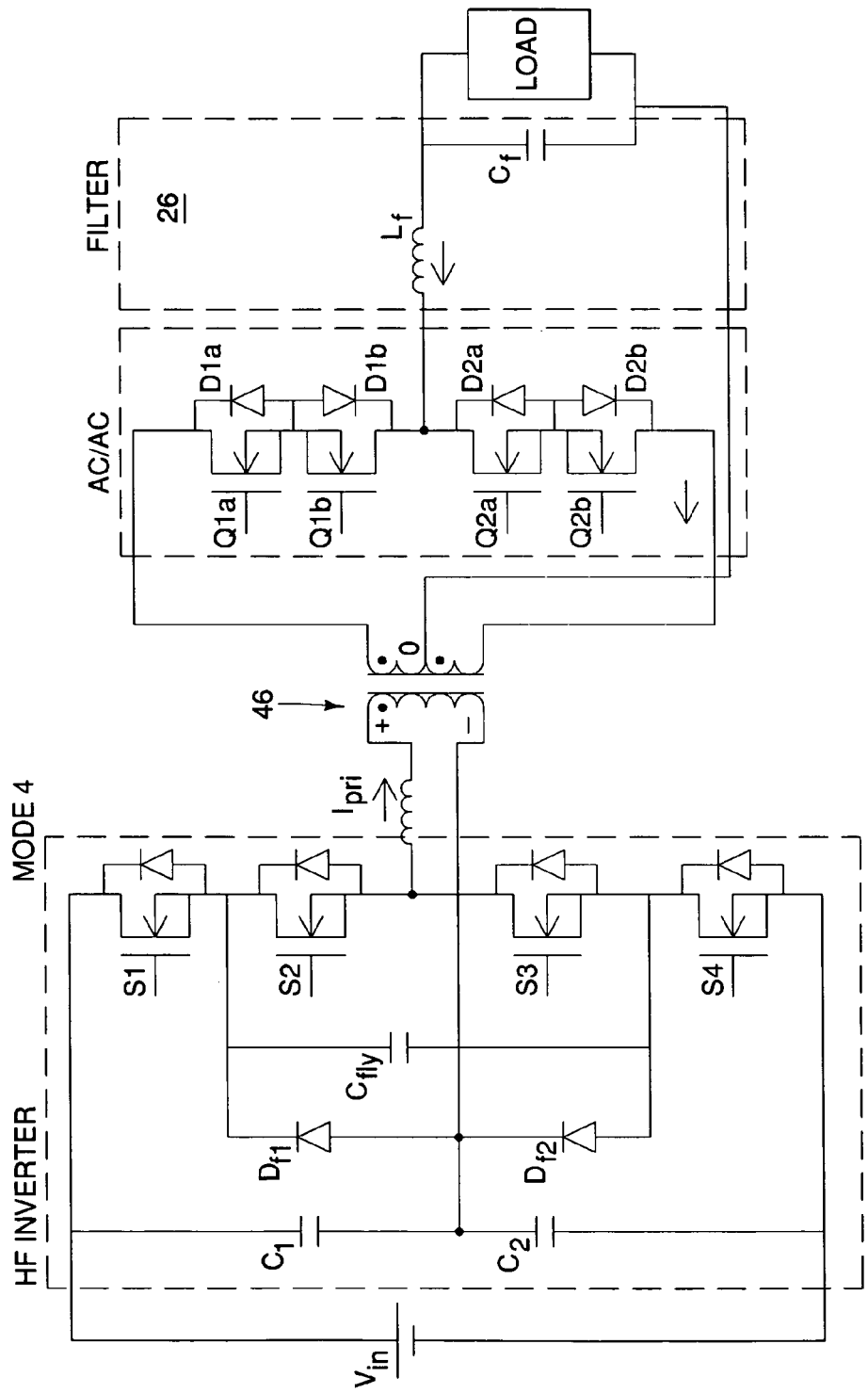

Signals and topologies for the four operating modes of the AC/AC converter 32 are shown in FIGS. 7-12. FIG. 7 shows the waveforms of the control or ramp signals from the ramp generator 42 (shown in FIG. 6), switches S1-S4 of the HF inverter 30 and switches Q1-Q2 of the AC/AC converter 32 for the period when the output load current is negative. FIG. 8 is shows the same waveforms for the period when the output load current is positive. The normal modes of operation discussed in this section assume that MOSFET body diodes D1a, D1b, D2a and D2b of MOSFETs Q1a, Q1b, Q2a and Q2b, respectively, of switches Q1 and Q2 are ideal.

During interval $t_0$-$t_1$ (Mode 1) (shown in FIG. 9), the primary voltage of the transformer 46 has a positive polarity (the drain of Q1a is positive with respect to the drain of Q2b), the primary current is negative and the current in the inductor $L_f$ of the filter 26 is negative. The power transfer to the load is negative and the inductor $L_f$ is considered large enough to maintain constant current. The current flows from the filter capacitor $C_f$, through a path including the inductor $L_f$, channel of the Q1b, diode D1a and transformer 46 secondary winding, and back to the capacitor $C_f$ of the output filter 26 through the center-tap of the transformer.

During interval $t_1$-$t_2$ (Mode 2) (shown in FIG. 10), the transformer 46 primary voltage and current have a negative polarity and the path of the inductor $L_f$ current flow is same as in Mode 1. Therefore, the drain of Q1a is positive with respect to the drain of Q2b and the power flow to the load 16 is positive during this interval.

During interval $t_2$-$t_3$ (Mode 3) (shown in FIG. 11), transformer 46 primary voltage has the same polarity as in Mode 2 and the primary current is positive. The inductor $L_f$ current flows from the capacitor $C_f$, through a path including the filter inductor $L_f$, the channel of the Q2a, diode D2b and secondary winding of the transformer 46 and back to the capacitor $C_f$ through the center-tap of the transformer. The power flow to the load 16 is negative during this interval.

During interval $t_3$-$t_4$ (Mode 4) (shown in FIG. 12), the transformer 46 primary voltage and current have a positive polarity and the inductor current flow path is same as in Mode 3. The power flow to the load 16 is positive during this interval.

Figure 13:
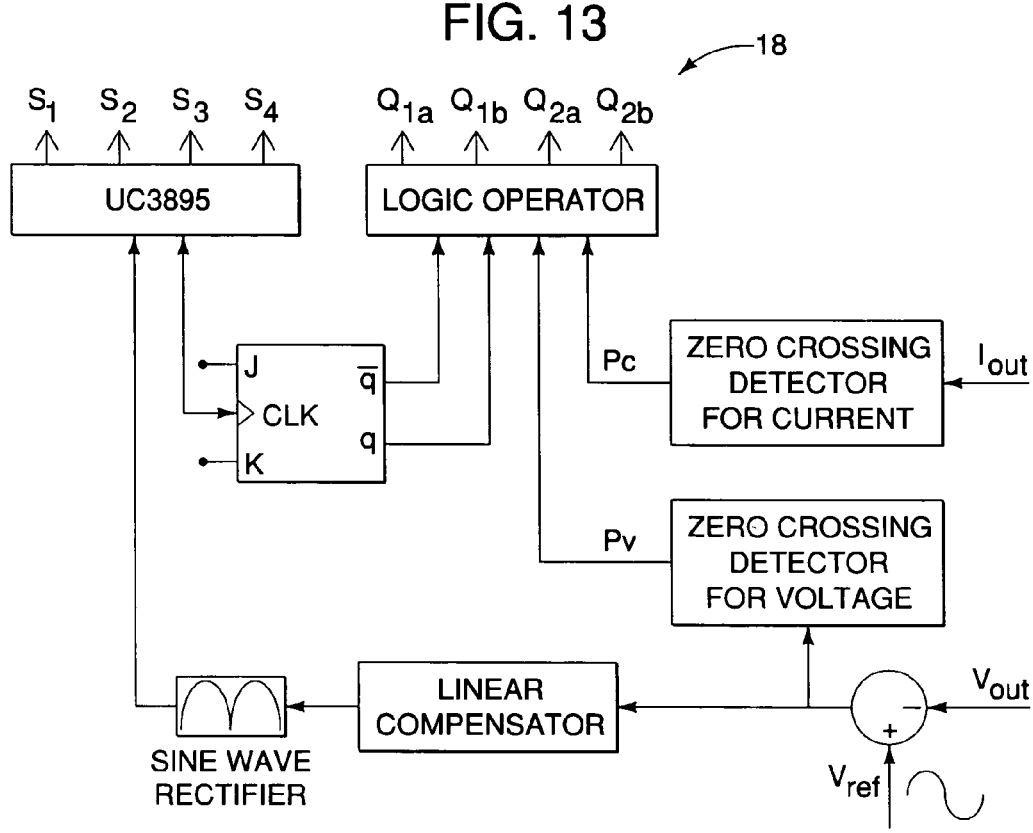
FIG. 13 is a block diagram of a controller for modulating the DC/AC inverter of the power conditioning system of FIG. 2.
Figure 14:
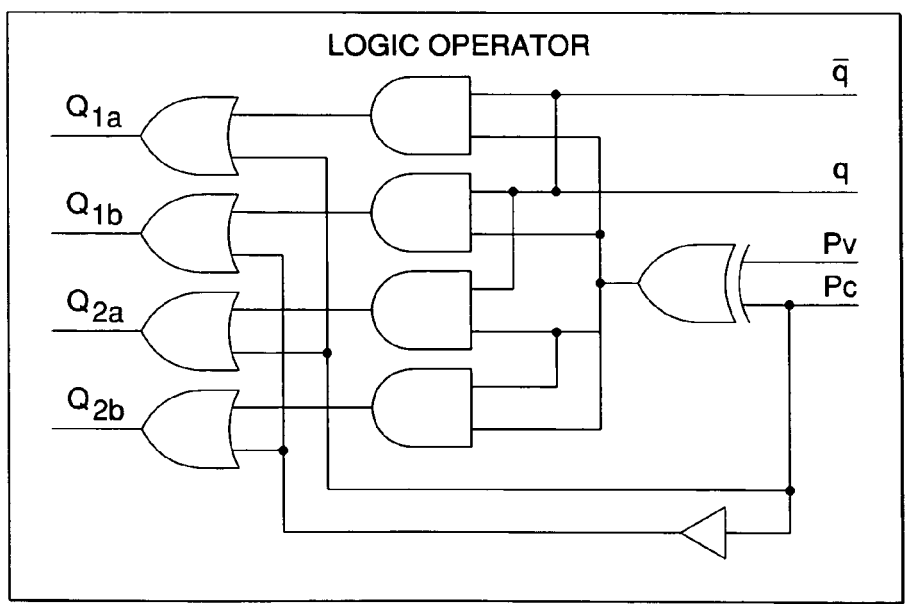
FIG. 14 is a circuit diagram of the logic operator of FIG. 13.
Figure 15:
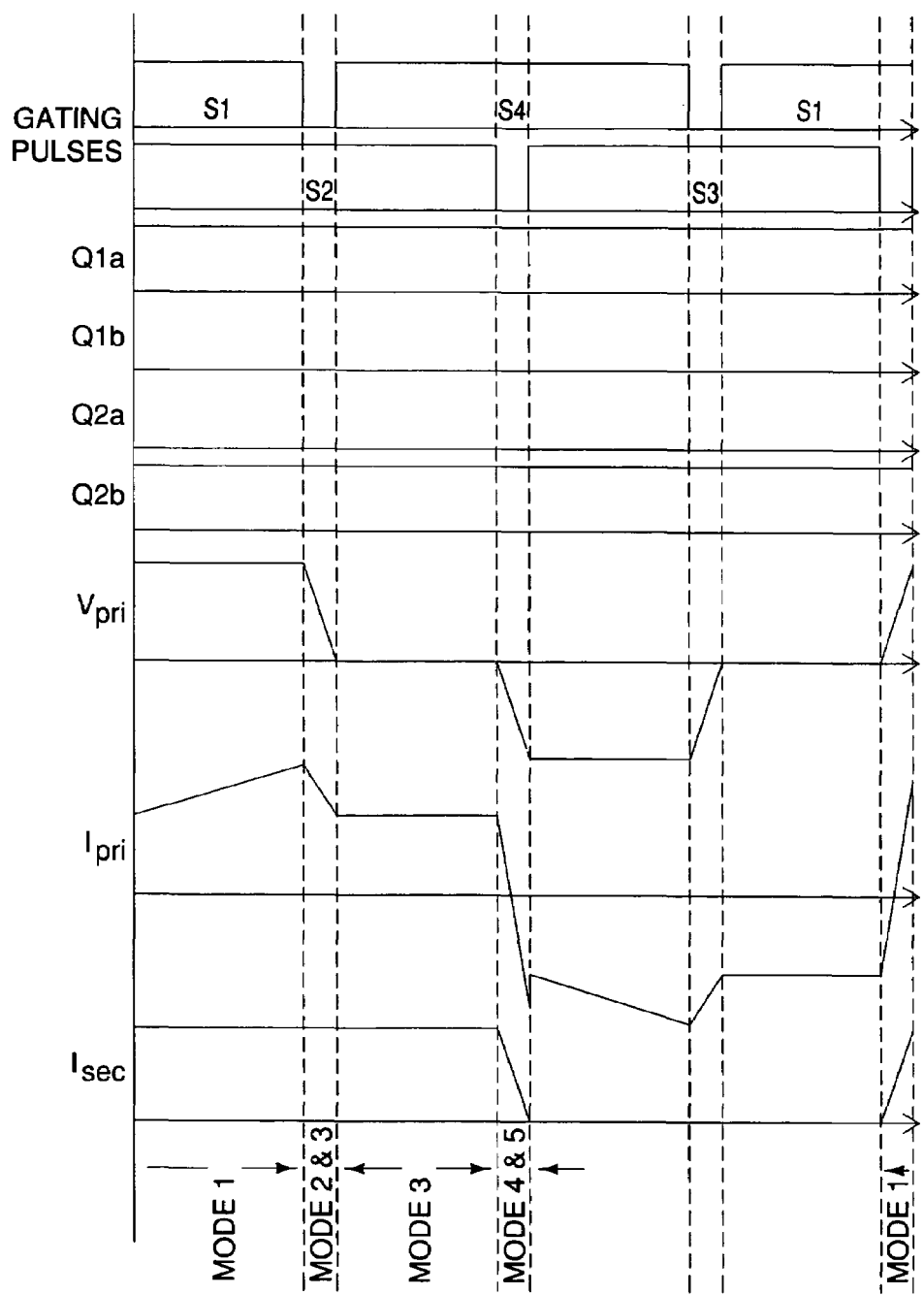
FIG. 15 shows the gating pulses of the high-frequency inverter and the AC/AC converter, the voltage across the primary windings of the high-frequency transformer and the current in the primary and secondary windings of the high-frequency transformer of the of the power conditioning system of FIG. 2.
Figure 16:
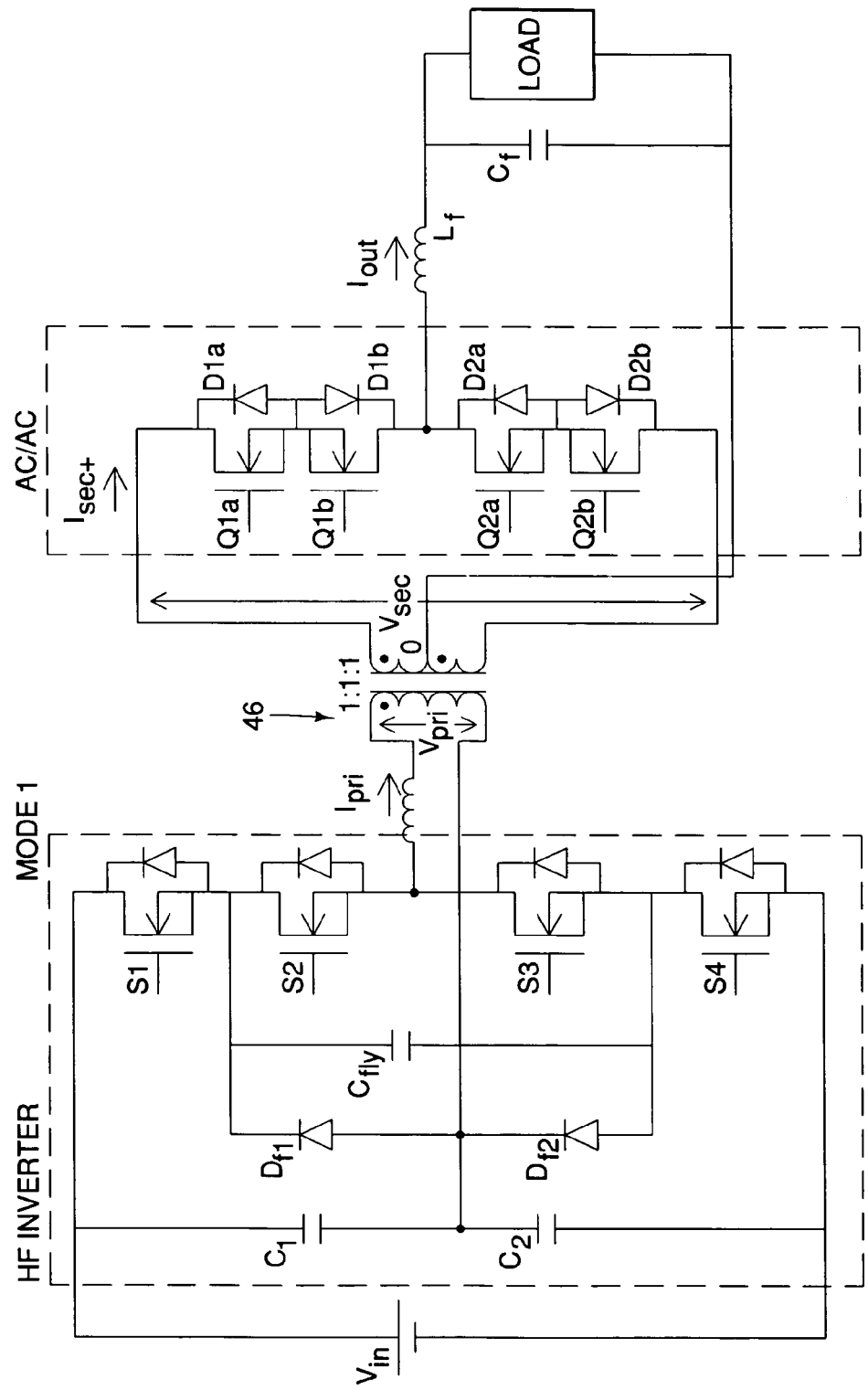
FIGS. 16-20 show the current flow in the high-frequency inverter and the AC/AC converter of the of the power conditioning system of FIG. 2 during five operating modes.
Figure 17:
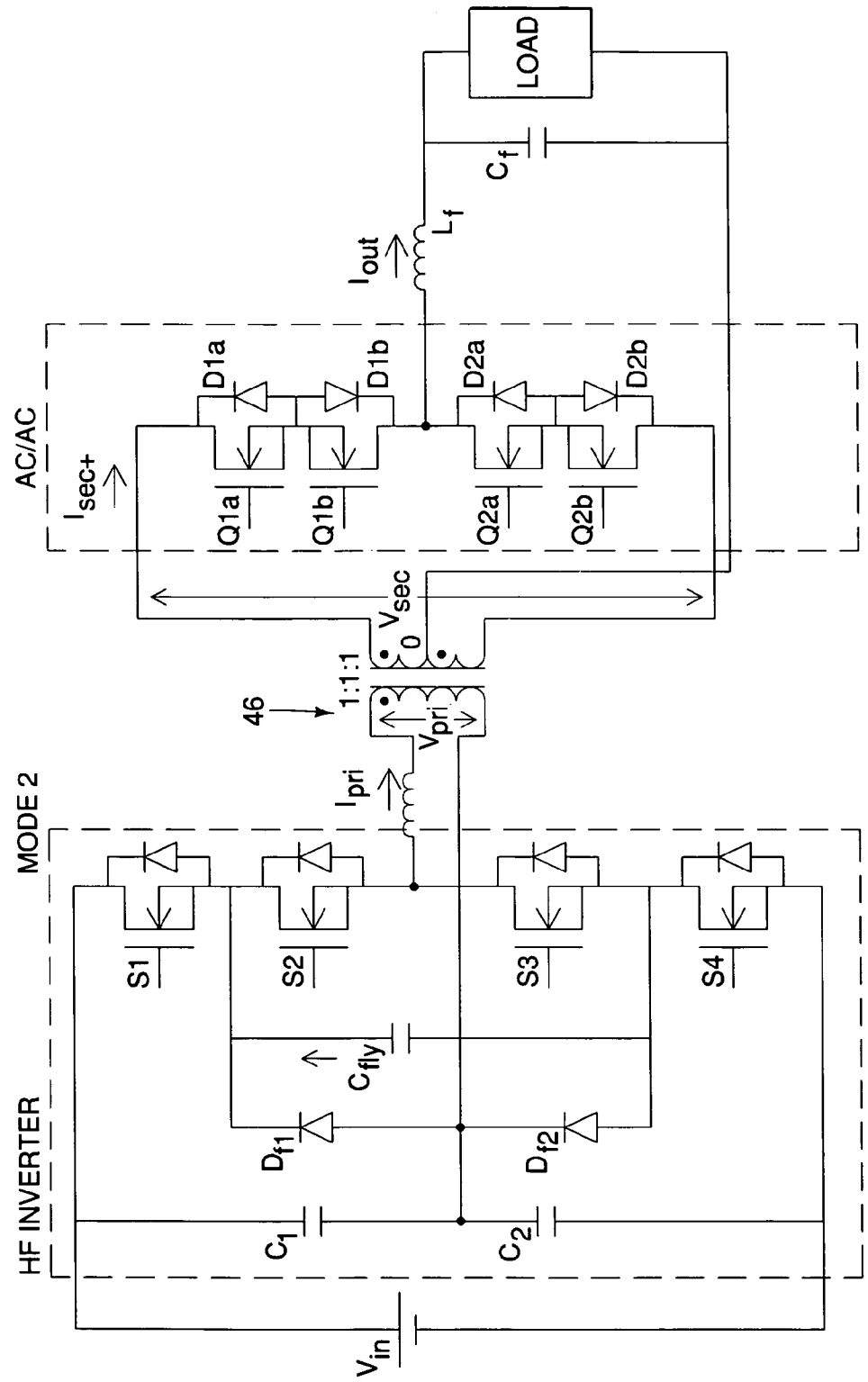
Figure 18:
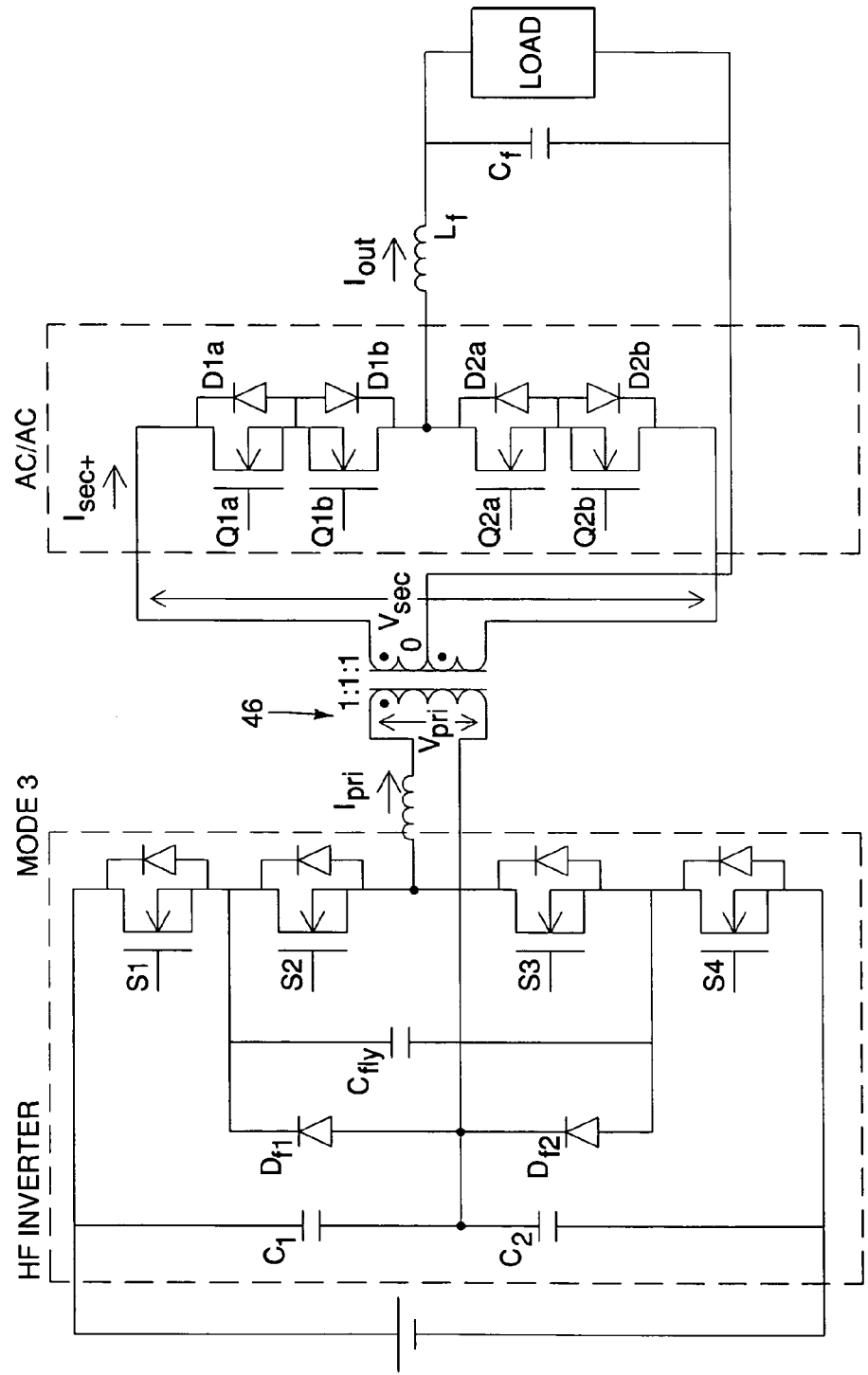
Figure 19:
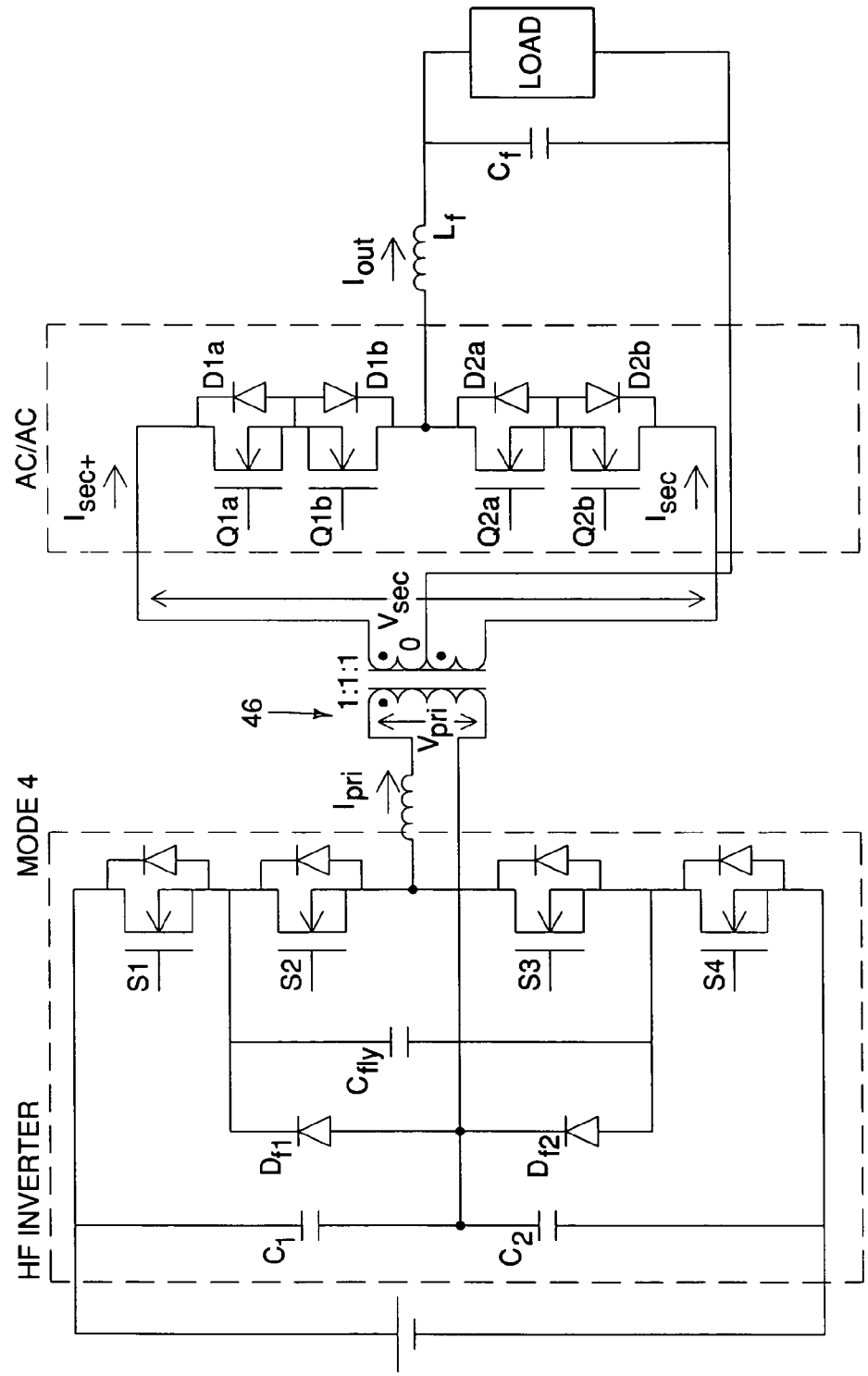
Figure 20:
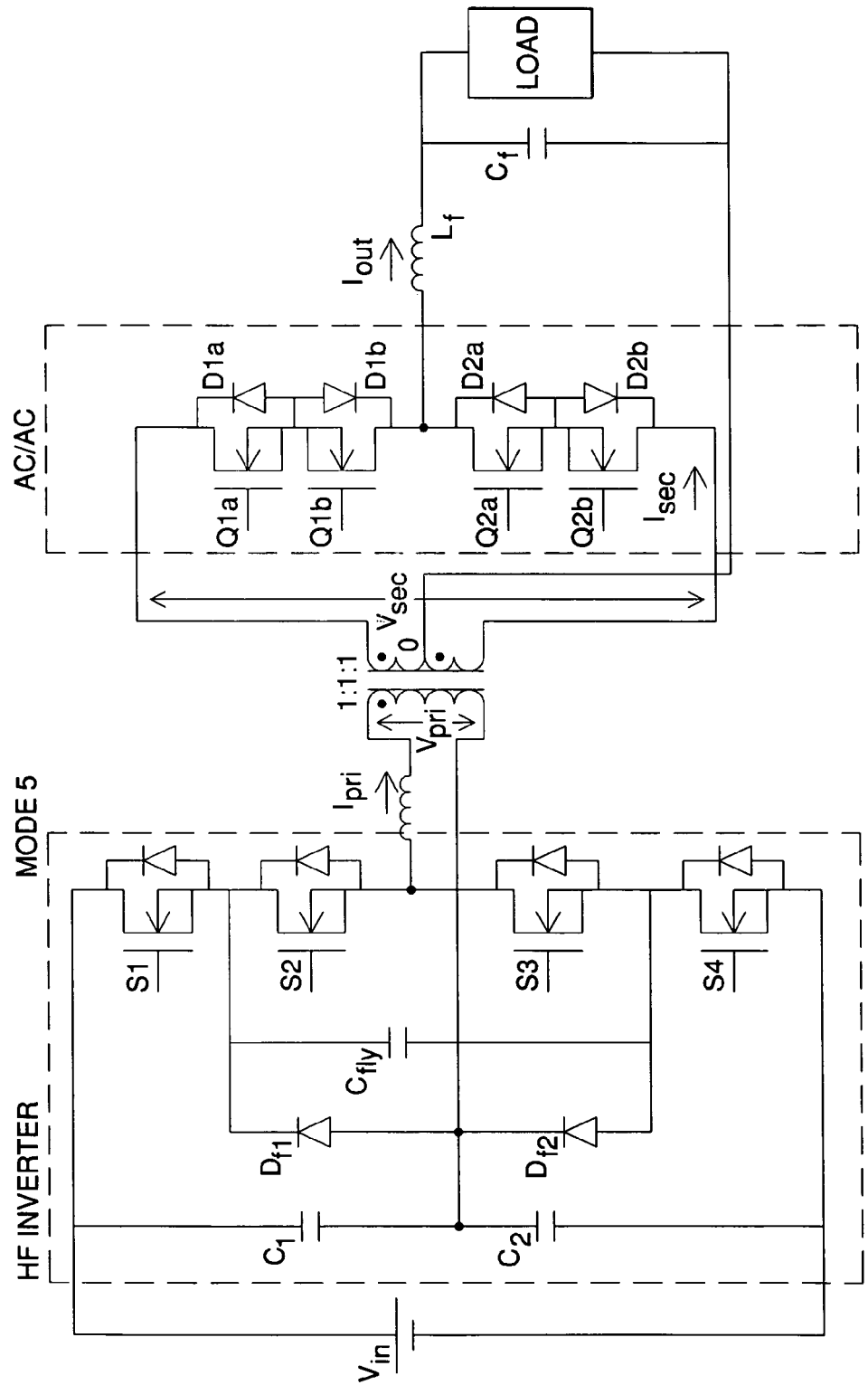

Turning now to FIGS. 13 and 14, another embodiment of the controller 18 is shown. The controller 18 is used for the second modulation scheme where the switches S1-S4 of the HF inverter 30 are rectified sine wave modulated, while the switches Q1-Q6 of the AC/AC converter 32 are operated based on the logic operator block shown in FIG. 14. A detailed description of the operation of the controller 18 shown in FIGS. 13 and 14 and provided in R. K. Burra, S. K. Mazumder, and R. Huang, A low-cost fuel-cell (FC) power electronic system (PCS) for residential loads, *IEEE*

*International Telecommunications energy conference*, 2004, pp. 468-478 and S. K. Mazumder and R. Burra, Keynote Lecture on Fuel cell power electronics system, *ASME Third International Conference on Fuel Cell Science, Engineering and Technology*, Yipsilanti, Mich., FUELCELL2005-74178, May 23-25, 2005, which are incorporated by reference herein in their entirety.

Current flow through the DC/AC inverter 14 during five modes of operation is described in FIGS. 16-20. Mode 1 (FIG. 16): During this mode, switches S1 and S2 of the HF inverter 30 are on and the transformer primary current $I_{pri}$ is positive. The output current $I_{out}$ is positive and flows through the bidirectional switch pair Q1a and Q1b of the output filter 26, and the center-tap of the secondary windings of transformer 46. Switches S3 and S4 and Q2a and Q2b are turned off during this interval.

Mode 2 (FIG. 17): At the beginning of this interval, the gate voltage of the switch S1 undergoes a high-to-low transition. As a result, the output capacitance of S1 begins to accumulate charge, and at the same time the output capacitance of switch S4 begins to discharge through the external fly capacitor ($C_{fly}$). Once the voltage across S4 goes to zero, it is can be turned on under ZVS. The transformer primary current $I_{pri}$ and the output current $I_{out}$ continue to flow in the same direction. Switch S2 and the bidirectional switch pair Q1a and Q1b are ON while S3 and S4 and Q2a and Q2b are OFF. This mode ends when the switch S1 is completely turned off and its output capacitance is charged to Vin/2.

Mode 3 (FIG. 18): This mode initiates when S1 turns off. The transformer primary current $I_{pri}$ is still positive, and freewheels through the diode D1a. Also the output current continues to flow in the same direction as in Mode 2. Mode 3 ends at the commencement of turn off S2.

Mode 4 (FIG. 19): At the beginning of this interval, the gate voltage of S2 undergoes a high to low transition. As a result of this the output capacitance of S2 begins to accumulate charge and at the same time the output capacitance of switch S3 begins to discharge. The charging current of S2 and discharging current of S3 together add up to the primary current $I_{pri}$. The transformer current makes a transition from positive to negative. Once the voltage across S3 goes to zero, it is turned on under ZVS. The output current flows in the same direction as in Mode 3, but makes a rapid transition from the bidirectional switches Q1a and Q1b to Q2a and Q2b. During this process $I_{out}$ splits between the two secondaries of the transformer 46 and flows through Q1a and Q1b and Q2a and Q2b. Mode 4 ends when the switch S2 is completely turned off and its output capacitance is charged to Vin/4. At this point, it is necessary to note that since S1 and S2 are off simultaneously, each of them support a voltage of Vin/4.

Mode 5 (FIG. 20): This mode starts when S2 turns off. The primary current $I_{pri}$ is positive, and while the output current is positive.

Figure 21:
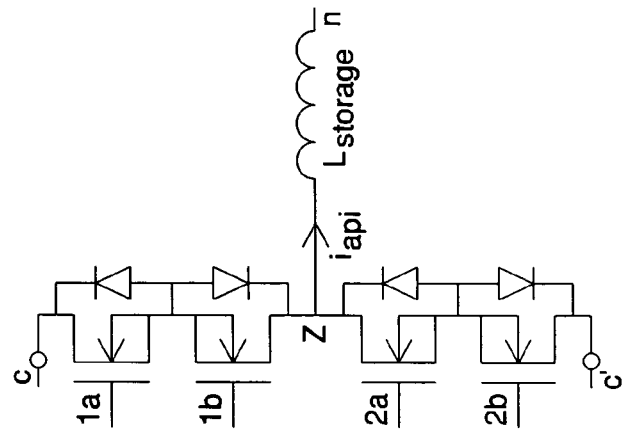
FIG. 21 is a circuit diagram of the active power filter of FIG. 1.

Turning now to FIGS. 1 and 21, the active power filter (APF) 22 for minimizing the low frequency ripple current harmonics of energy source 20 output current, performs a harmonic compensation on the load side (AC side) of the DC/AC inverter 14. More specifically, the APF 22 is configured to be connected to point c-c' of the DC/AC inverter 14 and includes switches 1a, 1b, 2a and 2b and a storage inductor $L_{storage}$. One end of the storage inductor $L_{storage}$ is connected to the point Z between the switch 1b and 2a and the other end is connected to the neutral point n. The neutral point n may be floating or connected to the center point of the secondary windings of the transformer 46.

Figure 22:
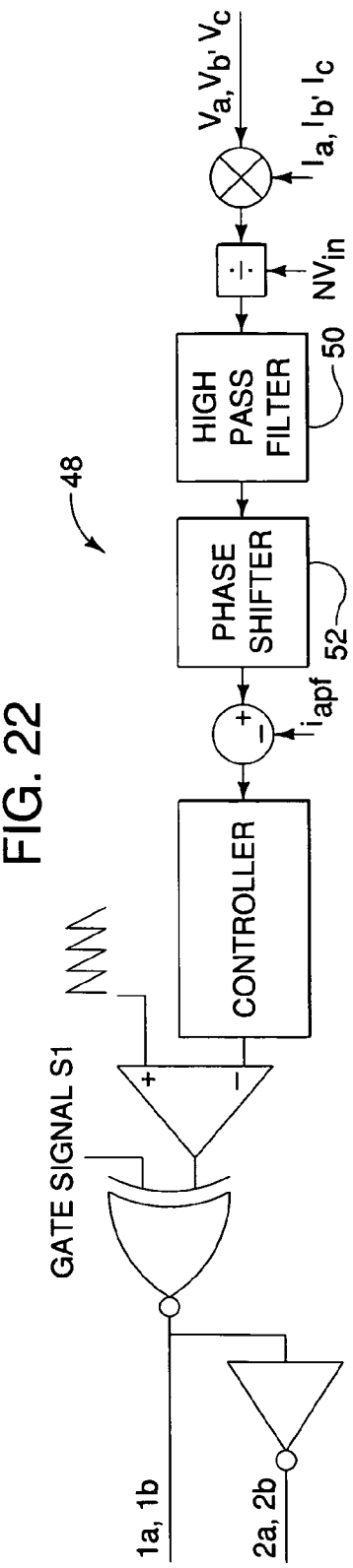
FIG. 22 is a circuit diagram of a controller for the active power filter of FIG. 21.

The signals for the switches 1a, 1b, 2a and 2b of the APF 20 are generated, in one embodiment, by a controller 48 shown in FIG. 22. All the blocks shown in this figure can be implemented in a DSP or using analog ICs. N is the transformer 46 turns ratio. The high-pass filter 50 eliminates the DC signals, while letting the AC signal to pass through. The phase-shifter 52 shifts this AC signal by an angle to compensate for the AC harmonics in the input current. To implement the controller 48 for the APF 20, a linear compensator 54 is used.

The APF 22 provides improvement in the efficiency of the power conditioning system 10 and reduces transformer and switch ratings, as compared to the low frequency harmonic compensation on the DC side. The APF 22 is modulated by extracting the harmonic content information from the average output power of the power conditioner. Harmonic compensation is achieved by modulating the AC output split filter capacitor voltage or the neutral, n.

Figure 23:
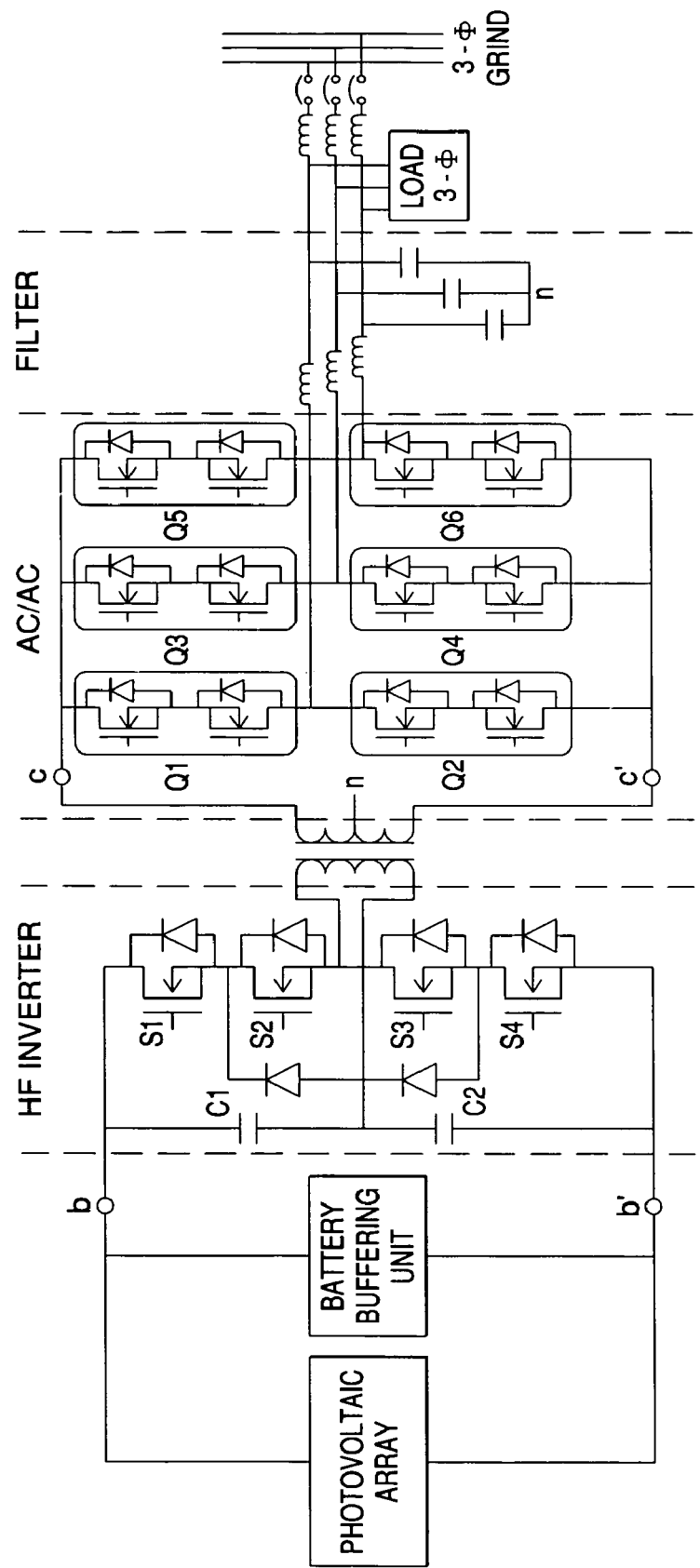
FIG. 23 is a circuit diagram of a power conditioning system in accordance with another embodiment of the present invention.

FIG. 23 shows a circuit diagram of a power conditioning system 10 in accordance with another embodiment of the present invention. In this embodiment, the energy source 20 is a high voltage source such as, for example, a photovoltaic array, that is capable of generating voltages greater than approximately 350 VDC. As such, the voltage output by the energy source 20 does not require a boost as in case where the energy source 20 outputs a relatively low voltage, e.g., approximately lower than 350 VDC. Accordingly, the power conditioning system 10 shown in FIG. 23 and adapted for use with a high voltage alternative-energy source 20 such as photovoltaic array is implemented without the boost converter 12 (shown in FIG. 2). The remaining features of the power conditioning system 10 shown in FIG. 23, is substantially similar to the embodiment shown in FIG. 2, in operation and configuration.

Figure 24:
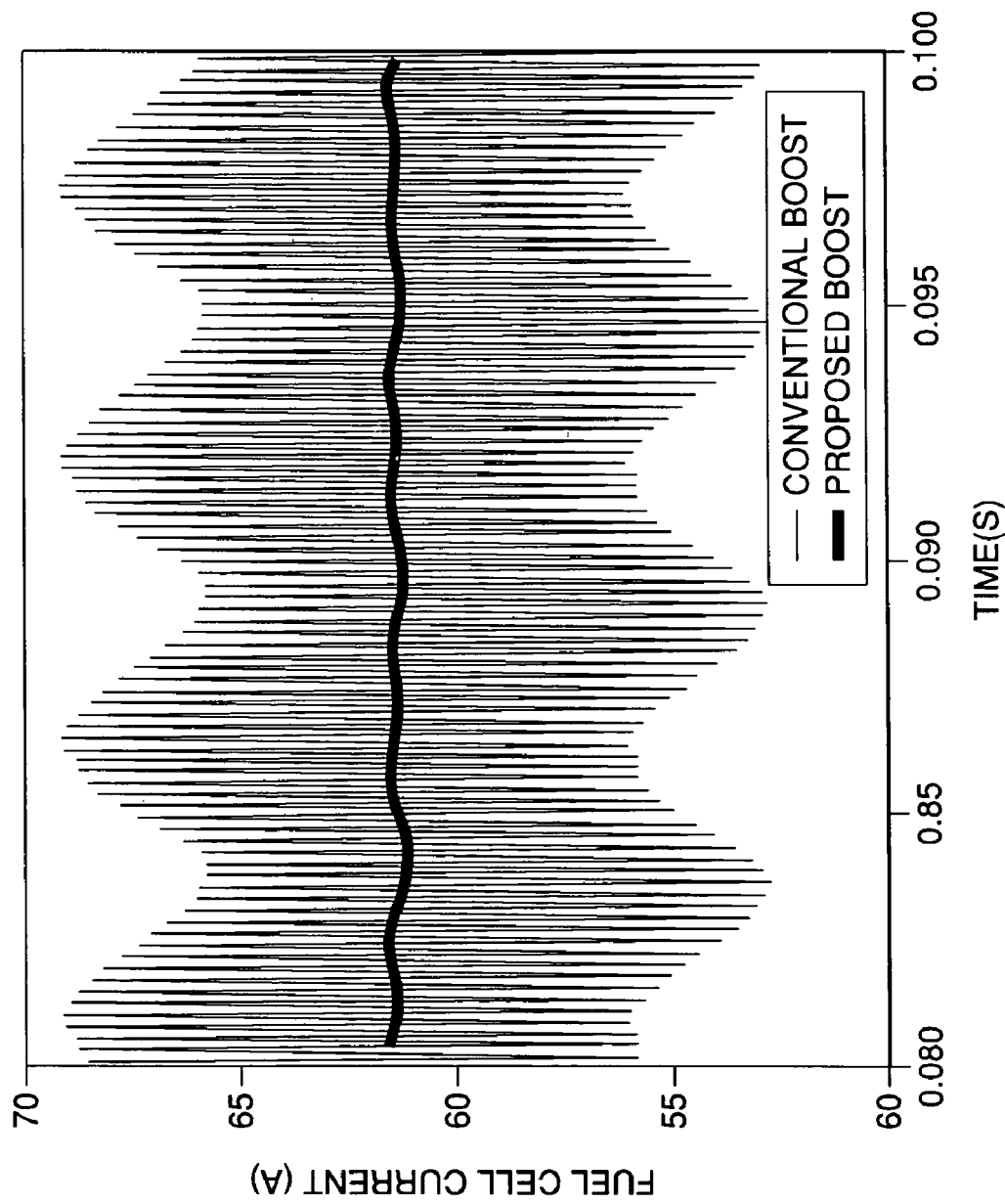
FIG. 24 shows the fuel cell current for the power conditioning system of FIG. 2, illustrating the relatively low current ripple obtained with the coupled inductor of present system.

FIG. 24 shows the comparison of the fuel cell current with the boost converter 12 and a conventional inductor. The input ripple current is less than 1% which is at least 15 times lower than what has been reported in literature.

Figure 25:
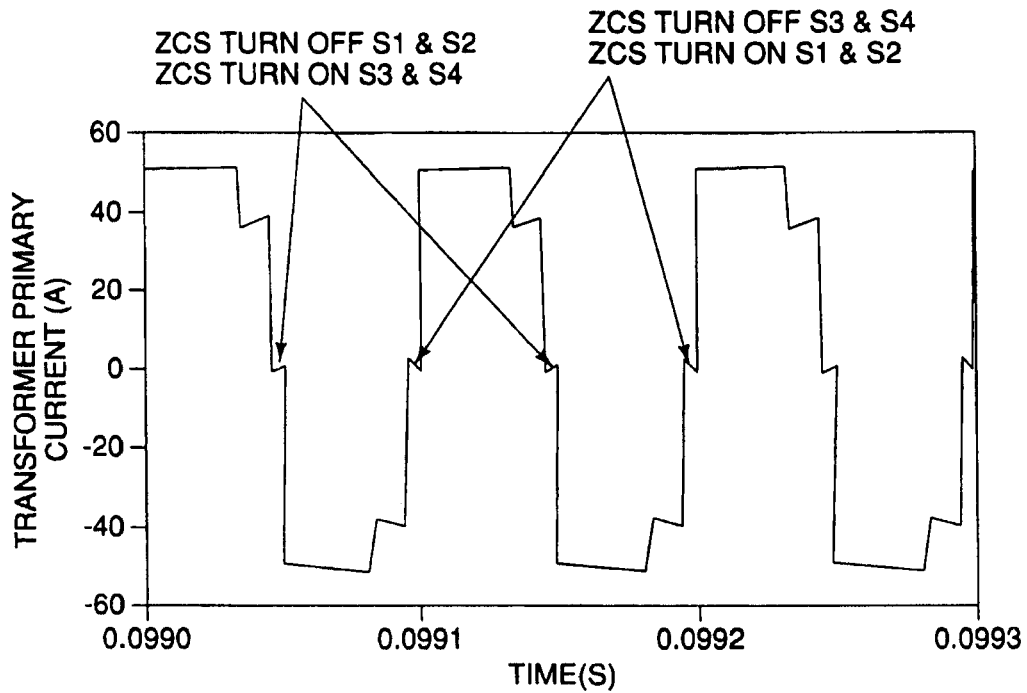
FIG. 25 shows the zero current turn-on and turn-off of all four switches of the high frequency inverter of the power conditioning system of FIG. 2.
Figure 26:
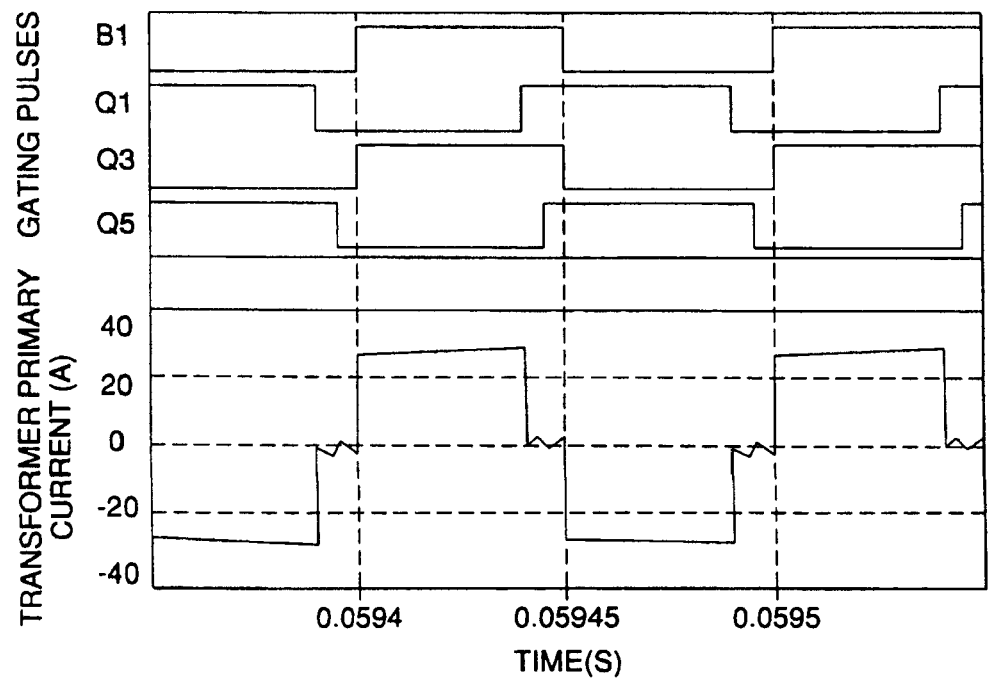
FIG. 26 shows that the current in the AC/AC converter of the power conditioning system of FIG. 2 is reduced to zero from a positive value when the load current freewheels.

The transformer primary current in FIG. 25 shows that the HF inverter 30 is a practically lossless converter. All the four switches S1-S4 turn on and off when the current is zero and if IGBTs are used the conduction losses could be significantly reduced. The lossless operation of the high frequency inverter 30, directly translates to reduced thermal management; thereby reducing the bulk and weight and increasing power density. As discussed before, zero current states in the transformer 46 primary windings are caused by the load current freewheeling in the legs of the AC/AC converter 32. FIG. 26 shows that, when the primary current is positive and all the upper three switches Q1, Q3 and Q5 are turned on simultaneously, the primary current jumps to zero instantaneously. This is because the load current freewheels through the load 16 and the upper 3 switches Q1, Q3 and Q5 of the AC/AC converter 32. Similarly, when the primary current is negative and the lower switches Q2, Q4 and Q6 are turned on, the current approaches zero from the negative side and creates another zero current state.

While a specific embodiment of the present invention has been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. Apparatus for conditioning power generated by an energy source, comprising:
   an inverter for converting a first DC input voltage to a first AC output voltage;
   a multiphase first converter for converting said first AC output voltage from said inverter to a second AC output voltage; and
   a second converter for increasing a voltage output by the energy source to said first DC input voltage, said second converter including a coupled inductor having a first winding for conducting DC current and a second winding for conducting AC current of said voltage output by the energy source for generating a substantially ripple free current from said voltage output.

2. The apparatus as defined in claim 1, wherein said first AC output voltage comprises a high frequency square wave AC output voltage and said second AC output voltage comprises a sine wave AC output voltage.

3. The apparatus as defined in claim 2, wherein said inverter comprises a plurality of switches that are turned on and off at a predetermined duty pulse to generate said high frequency square wave AC output voltage.

4. The apparatus as defined in claim 3, wherein said plurality of switches of said inverter are connected in a multi-level arrangement with said first AC output voltage being output between a select pair of said switches.

5. The apparatus as defined in claim 2, wherein said converter is sine wave modulated to generate said sine wave AC output voltage.

6. The apparatus as defined in claim 2, wherein said first converter comprises a pair of bidirectional switches for each phase of said sine wave AC output voltage.

7. The apparatus as defined in claim 1, wherein energy source comprises at least one fuel cell (FC).

8. The apparatus as defined in claim 1, wherein said energy source comprises a photovoltaic array.

9. The apparatus as defined in claim 1, further comprising an active power filter connected to input of said first converter for reducing a low frequency ripple current in said first DC input voltage.

10. The apparatus as defined in claim 1, further comprising a transformer for transmitting said first AC output voltage from said inverter to said first converter.

11. The apparatus as defined in claim 1, wherein said multiphase first converter comprises a full bridge AC/AC converter.

12. Apparatus for conditioning power generated by an energy source, comprising:
   a boost converter for increasing a voltage output by the energy source to a first DC input voltage, said boost converter including a coupled inductor having a first winding conducting DC current and a second winding conducting AC current;
   a DC/AC inverter for converting said first DC input voltage to a first AC output voltage;
   a multiphase AC/AC converter for converting said first AC output voltage from said inverter to a second AC output voltage; and
   means for transmitting said first AC output voltage from said inverter to said AC/AC converter.

13. The apparatus as defined in claim 12, wherein said DC/AC comprises a plurality of switches connected in a multi-level arrangement with said first AC output voltage being output between a select pair of said switches.

14. The apparatus as defined in claim 12, wherein said AC/AC converter comprises a pair of bidirectional switches for each phase of said sine wave AC output voltage.

15. The apparatus as defined in claim 12, wherein said multiphase AC/AC converter comprises a full bridge AC/AC converter.

16. A power electronic system for conditioning power from a fuel cell, such system comprising:
   a boost converter adapted to boost a voltage of a direct current (DC) output voltage from the fuel cell, and to substantially cancel input ripple current at the fuel cell through mutual inductance;
   a high frequency converter with a plurality of switching elements adapted to convert the direct current (DC) voltage from the boost converter into a square wave alternating current (AC) voltage; and
   an AC to AC converter adapted to reduce a current in each of the switching elements of the high frequency converter substantially to zero before a switching element is switched for converting the AC voltage from the high frequency converter to AC output voltage.

17. The apparatus as defined in claim 16, wherein said boost converter comprises a coupled inductor having a first winding conducting DC current and a second winding conducting AC current.

* * * * *

UNITED STATES PATENT AND TRADEMARK OFFICE
CERTIFICATE OF CORRECTION

PATENT NO. : 7,372,709 B2 Page 1 of 1
APPLICATION NO. : 11/230312
DATED : May 13, 2008
INVENTOR(S) : Mazumder et al.

It is certified that error appears in the above-identified patent and that said Letters Patent is hereby corrected as shown below:

In the Drawings:

| | | |
|---|---|---|
| Sheet 4 of 21 | FIG. 5 | Please delete the word "REPPLE" and insert -- RIPPLE -- in its place. |
| | Col. 1, line 35 | Please delete "to, forms" and insert -- to forms, -- in its place. |
| | Col. 2, line 56 | After the word "transformer" please delete "of the of the" and insert -- of the -- in its place. |

Signed and Sealed this

Ninth Day of June, 2009

JOHN DOLL
*Acting Director of the United States Patent and Trademark Office*